(12) United States Patent
Syed

(10) Patent No.: US 6,954,869 B2
(45) Date of Patent: Oct. 11, 2005

(54) METHODS AND APPARATUS FOR CLOCK DOMAIN CONVERSION IN DIGITAL PROCESSING SYSTEMS

(75) Inventor: Moinul I. Syed, Austin, TX (US)

(73) Assignee: Analog Devices, Inc., Norwood, MA (US)

( * ) Notice: Subject to any disclaimer, the term of this patent is extended or adjusted under 35 U.S.C. 154(b) by 413 days.

(21) Appl. No.: 10/255,477

(22) Filed: Sep. 26, 2002

(65) Prior Publication Data

US 2004/0064748 A1 Apr. 1, 2004

(51) Int. Cl.[7] .............................. G06F 1/12; G06F 1/06; G06F 1/04
(52) U.S. Cl. ........................ 713/400; 713/500; 713/600
(58) Field of Search ................................ 713/400, 500, 713/600

(56) References Cited

U.S. PATENT DOCUMENTS

| | | | |
|---|---|---|---|
| 5,535,377 A | * | 7/1996 | Parks ......................... 713/400 |
| 5,548,620 A | * | 8/1996 | Rogers ........................ 375/354 |
| 6,516,362 B1 | * | 2/2003 | Magro et al. .................. 710/58 |
| 6,549,593 B1 | * | 4/2003 | Rumreich et al. ........... 375/354 |

* cited by examiner

*Primary Examiner*—Thuan Du
*Assistant Examiner*—Stefan Stoynov
(74) *Attorney, Agent, or Firm*—Wolf, Greenfield & Sacks, P.C.

(57) ABSTRACT

Methods and apparatus are provided for clock domain conversion in digital processing systems. The methods include operating a first circuit in a fast clock domain with a fast clock and operating a second circuit in a slow clock domain with a slow clock. To transfer signals from the fast clock domain to the slow clock domain, a first synchronization signal is asserted during each fast clock cycle in which a slow clock edge occurs. A fast signal is transferred from the fast clock domain to the slow clock domain on a fast clock edge when the first synchronization signal is asserted. To transfer signals from the slow clock domain to the fast clock domain, a second synchronization signal is asserted during each fast clock cycle that immediately follows a slow clock edge. A slow signal is transferred from the slow clock domain to the fast clock domain on a fast clock edge when the second synchronization signal is asserted.

14 Claims, 21 Drawing Sheets

External Memory Map

| Address | Region |
|---|---|
| 0xEEFF FFFF → | PCI Config Space Port (4 Bytes) |
| 0xEEFF FFFC → | PCI Config Registers (64KBytes) |
| 0xEEFF FF00 → | Reserved |
| 0xEEFE FFFF → | PCI IO Space (64KBytes) |
| 0xEEFE 0000 → | Reserved |
| 0xE7FF FFFF → | PCI Memory Space (128MBytes) |
| 0xE000 0000 → | Reserved |
| 0x2FFF FFFF → | ASYNC Memory Bank 3 (64MBytes) |
| 0x2C00 0000 → | ASYNC Memory Bank 2 (64MBytes) |
| 0x2800 0000 → | ASYNC Memory Bank 1 (64MBytes) |
| 0x2400 0000 → | ASYNC Memory Bank 0 (64MBytes) |
| 0x2000 0000 → | SDRAM Memory Bank 3 (16MB–128MBytes)* |
| 0x1800 0000 → | SDRAM Memory Bank 2 (16MB–128MBytes)* |
| 0x1000 0000 → | SDRAM Memory Bank 1 (16MB–128MBytes)* |
| 0x0800 0000 → | SDRAM Memory Bank 0 (16MB–128MBytes)* |
| 0x0000 0000 → | |

| Cycle 1 | Cycle 2 | Cycle 3 | Cycle 4 | Cycle 5 | Cycle 6 |
|---|---|---|---|---|---|
| Arbitration | L2 Read Request by SBIU | L2 Address Decode | L2 Memory Array Access | L2 Memory Drives Read Data Bus | SBIU Drives Read Data to Core |
| Core Requests | L2 Acks SBIU Request | Address Ack to Core | | | Data Ack to Core |

FIG. 7A

| Cycle 1 | Cycle 2 | Cycle 3 | Cycle 4 |
|---|---|---|---|
| Arbitration | L2 Write Request by SBIU | L2 Address Decode | L2 Memory Array Access |
| Core Requests | L2 Acks SBIU Request | Address Ack to Core | Data Written in L2 |
| | | WR Data Ack to Core | |

FIG. 8

METHODS AND APPARATUS FOR CLOCK DOMAIN CONVERSION IN DIGITAL PROCESSING SYSTEMS

FIELD OF THE INVENTION

This invention relates to digital processing systems and, more particularly, to methods and apparatus for transferring digital signals between clock domains which operate at different clock frequencies. The clock domain conversion methods and apparatus are particularly useful in digital signal processors, but are not limited to such applications.

BACKGROUND OF INVENTION

A digital signal computer, or digital signal processor (DSP), is a special purpose computer that is designed to optimize performance for digital signal processing applications, such as, for example, fast Fourier transforms, digital filters, image processing, signal processing in wireless systems, and speech recognition. Digital signal processor applications are typically characterized by real time operation, high interrupt rates and intensive numeric computations. In addition, digital signal processor applications tend to be intensive in memory access operations and to require the input and output of large quantities of data. Digital signal processor architectures are typically optimized for performing such computations efficiently.

Digital signal processors may include components such as a core processor, memory, a DMA controller, an external bus interface, and a serial port interface on a single chip or substrate. The components of the digital signal processor are interconnected by a bus architecture which produces high performance under desired operating conditions.

Such complex digital systems frequently include two or more clock domains which operate at different clock frequencies. For example, processors and on-chip memories may operate at the highest clock frequency and peripheral interfaces may operate at a lower clock frequency. In the operation of the system, digital signals must cross between clock domains. In prior art systems, synchronizers have been used for clock domain conversion. However, synchronizers add latency and degrade system performance.

Accordingly, there is a need for improved methods and apparatus for clock domain conversion in digital processing systems.

SUMMARY OF THE INVENTION

According to a first aspect of the invention, a method is provided for clock domain conversion in a digital processing system. The method comprises operating a first circuit in a fast clock domain with a fast clock and generating a fast signal in the fast clock domain, operating a second circuit in a slow clock domain with a slow clock, generating a first synchronization signal, based on the fast clock and the slow clock, that is asserted during each fast clock cycle in which a slow clock edge occurs, and transferring the fast signal from the fast clock domain to the slow clock domain on a fast clock edge when the first synchronization signal is asserted.

The fast clock and the slow clock may have a selectable clock frequency ratio. The selectable clock frequency ratio may be an integer or a non-integer.

The step of transferring the fast signal from the fast clock domain to the slow clock domain may comprise applying the fast signal to a data input of a flip-flop, applying the first synchronization signal to an enable input of the flip-flop and applying the fast clock to a clock input of the flip-flop, wherein the output of the flip-flop is in the slow clock domain.

According to another aspect of the invention, a method is provided for clock domain conversion in a digital processing system. The method comprises operating a first circuit in a fast clock domain with a fast clock, operating a second circuit in a slow clock domain with a slow clock and generating a slow signal in the slow clock domain, generating a second synchronization signal, based on the fast clock and the slow clock, that is asserted during each fast clock cycle that immediately follows a slow clock edge, and transferring the slow signal from the slow clock domain to the fast clock domain on a fast clock edge when the second synchronization signal is asserted.

The step of transferring the slow signal from the slow clock domain to the fast clock domain may comprise applying the slow signal to a data input of a flip-flop, applying the second synchronization signal to an enable input of the flip-flop and applying the fast clock to a clock input of the flip-flop, wherein an output of the flip-flop is in the fast clock domain.

According to a further aspect of the invention, apparatus is provided for clock domain conversion in a digital processing system. The apparatus comprises a first clock for generating a fast clock, a second clock for generating a slow clock, a synchronization circuit for generating a first synchronization signal, based on the fast clock and the slow clock, that is asserted during each fast clock cycle in which a slow clock edge occurs, and a transfer circuit for transferring a fast signal from the fast clock domain to the slow clock domain on a fast clock edge when the first synchronization signal is asserted.

According to a further aspect of the invention, apparatus is provided for clock domain conversion in a digital processing system. The apparatus comprises a first clock for generating a fast clock, a second clock for generating a slow clock, a synchronization circuit for generating a second synchronization signal, based on the fast clock and the slow clock, that is asserted during each fast clock cycle that immediately follows a slow clock edge, and a transfer circuit for transferring a slow signal from the slow clock domain to the fast clock domain on a fast clock edge when the second synchronization signal is asserted.

BRIEF DESCRIPTION OF THE DRAWINGS

For a better understanding of the present invention, reference is made to the accompanying drawings, which are incorporated herein by reference and in which:

FIGS. 3A and 3B are examples of internal and external memory maps, respectively, of the digital signal processor embodiment of FIG. 1;

FIG. 7A is a timing diagram of a memory read pipeline in accordance with an embodiment of the invention;

FIG. 8 is a timing diagram of a memory write pipeline in accordance with an embodiment of the invention;

DETAILED DESCRIPTION

Figure 1:
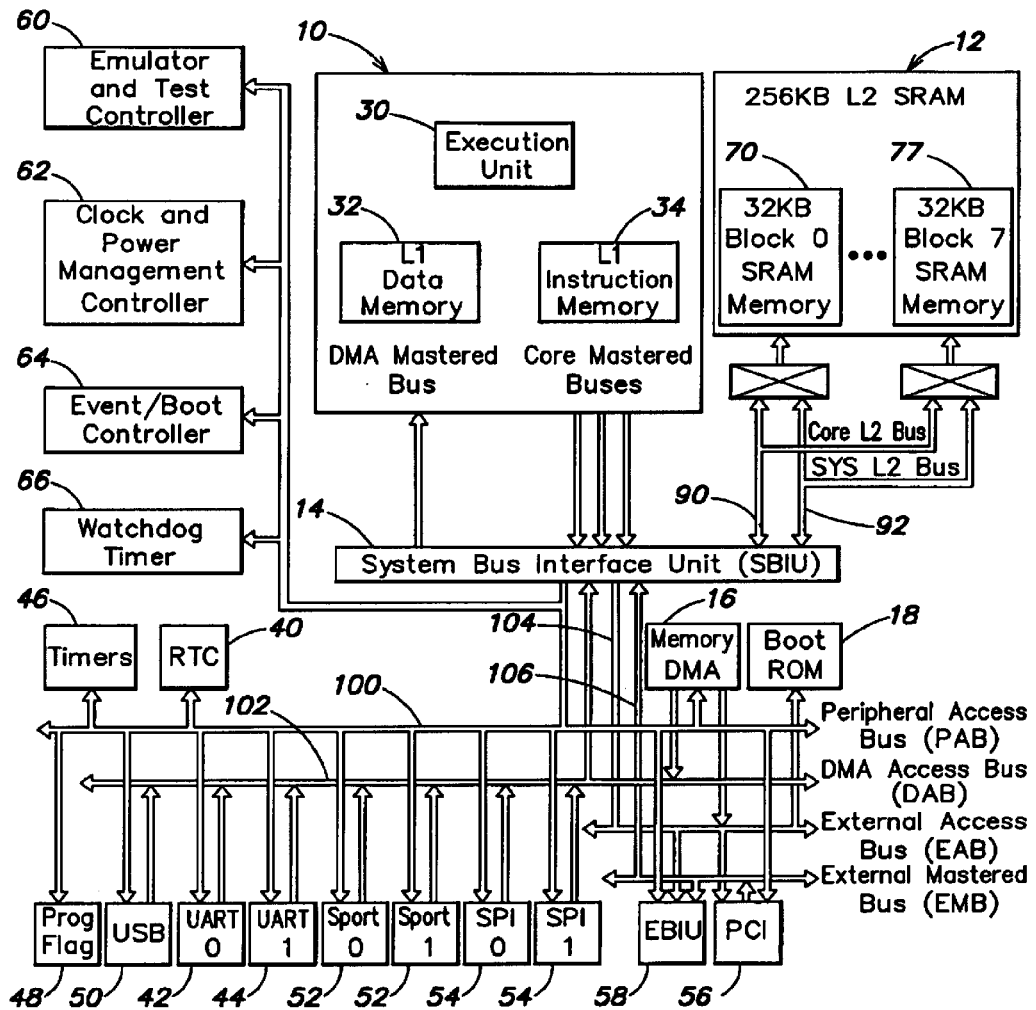
FIG. 1 is a block diagram of a digital signal processor in accordance with an embodiment of the invention.

A digital signal processor in accordance with an embodiment of the invention is shown in FIGS. 1–4. The digital signal processor (DSP) includes a core processor 10, a level two (L2) memory 12, a system bus interface unit (SBIU) 14, a DMA controller 16 and a boot ROM 18. Core processor 10 includes an execution unit 30, a level one (L1) data memory 32, an L1 instruction memory 34 and a memory management unit 36 (see FIG. 2). In some embodiments, L1 data memory 32 may be configured as SRAM or as data cache and L1 instruction memory 34 may be configured as SRAM or as instruction cache. In one embodiment, L1 data memory 32 includes 32K bytes of data SRAM/cache and 4K bytes of data scratchpad SRAM, and L1 instruction memory 34 includes 16K bytes of instruction SRAM/cache. The DSP may further include real-time clock 40, UART port 42, UART port 44, timers 46, programmable flags 48, USB interface 50, serial ports 52, SPI ports 54, PCI bus interface 56 and external bus interface unit 58. The DSP may also include an emulator and test controller 60, a clock and power management controller 62, an event/boot controller 64 and a watchdog timer 66.

Figure 3A:
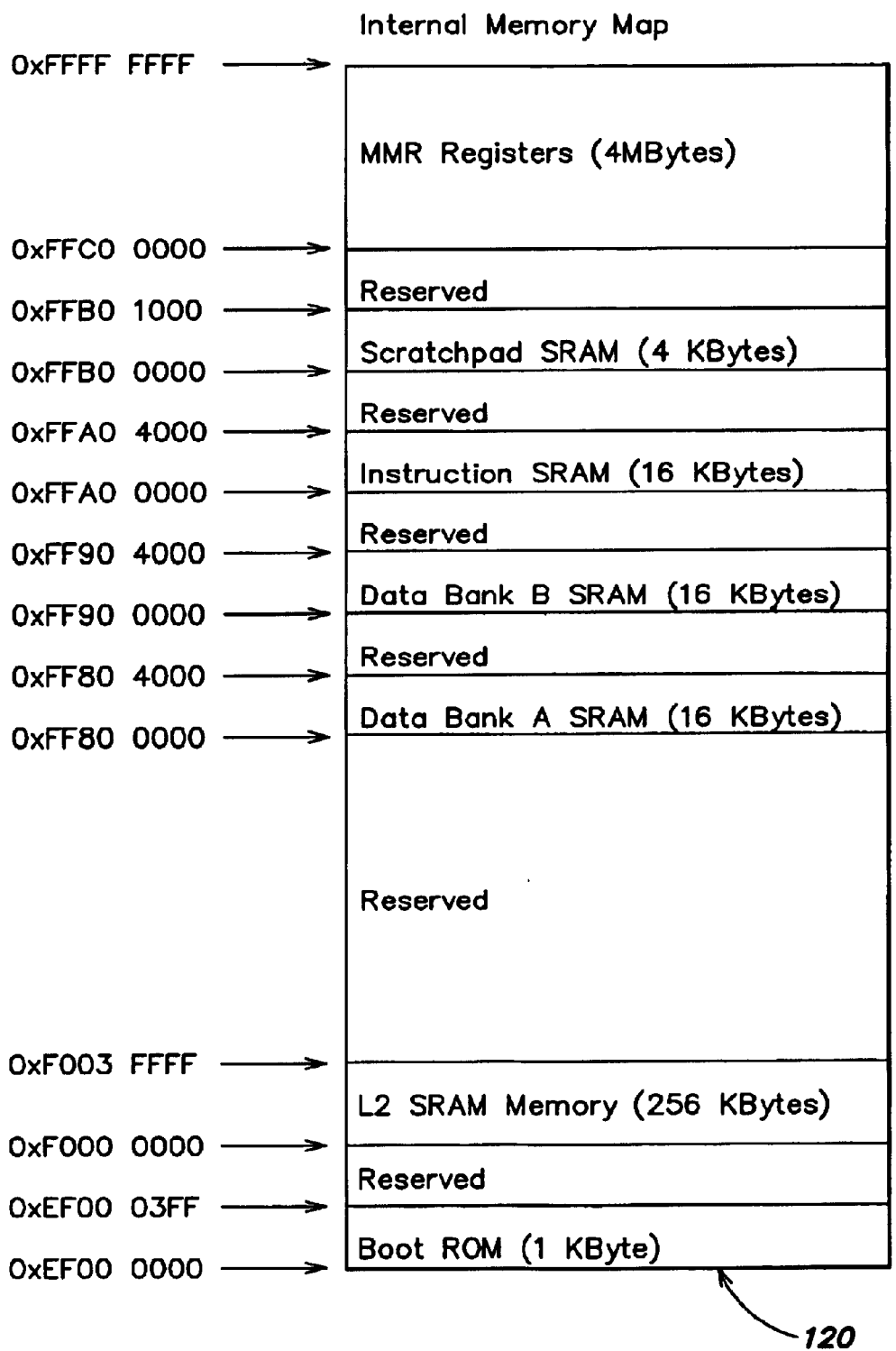

An example of a memory map of the digital signal processor is shown in FIGS. 3A and 3B. An internal memory map 120 is shown in FIG. 3A, and an external memory map 122 is shown in FIG. 3B. An upper portion of the internal memory space is allocated to the core processor 10 and system memory management registers. The on-chip L2 memory 12 is allocated to the lower portion of internal memory space. External memory map 122 includes PCI memory space, PCI I/O space and PCI configuration space. In addition, four banks are available for SDRAM. Each bank may vary in size from 16 megabytes to 128 megabytes. An additional four banks of asynchronous memory space, each of 64 megabytes, are also available.

Figure 4:
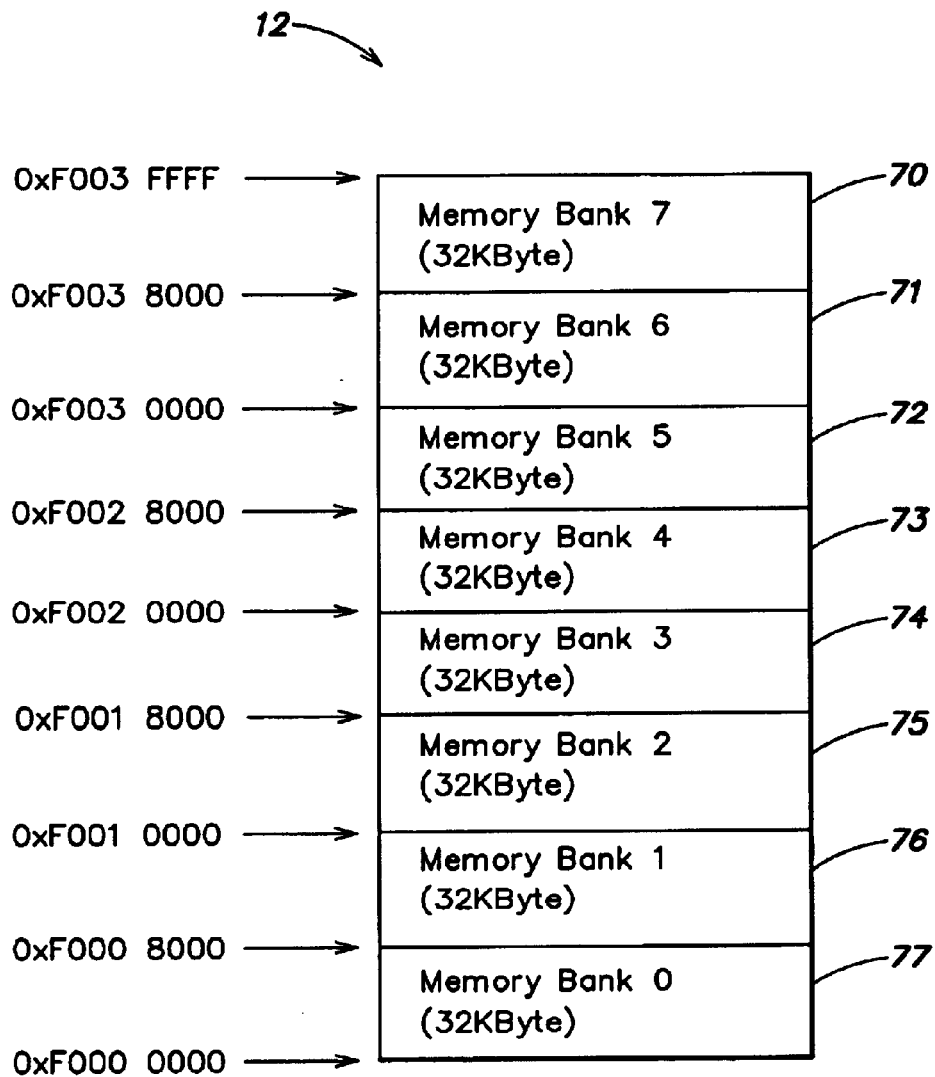
FIG. 4 is an example of a level 2 (L2) memory map of the digital signal processor embodiment of FIG. 1.

The L2 memory map is expanded in FIG. 4. L2 memory 12 may be organized in blocks. In the embodiment of FIGS. 1–4, L2 memory 12 has a capacity of 256 kilobytes and is organized as eight blocks 70, 71, . . . 77 of 32 kilobytes each. Blocks 70, 71, . . . 77 are independently accessible.

Figure 2:
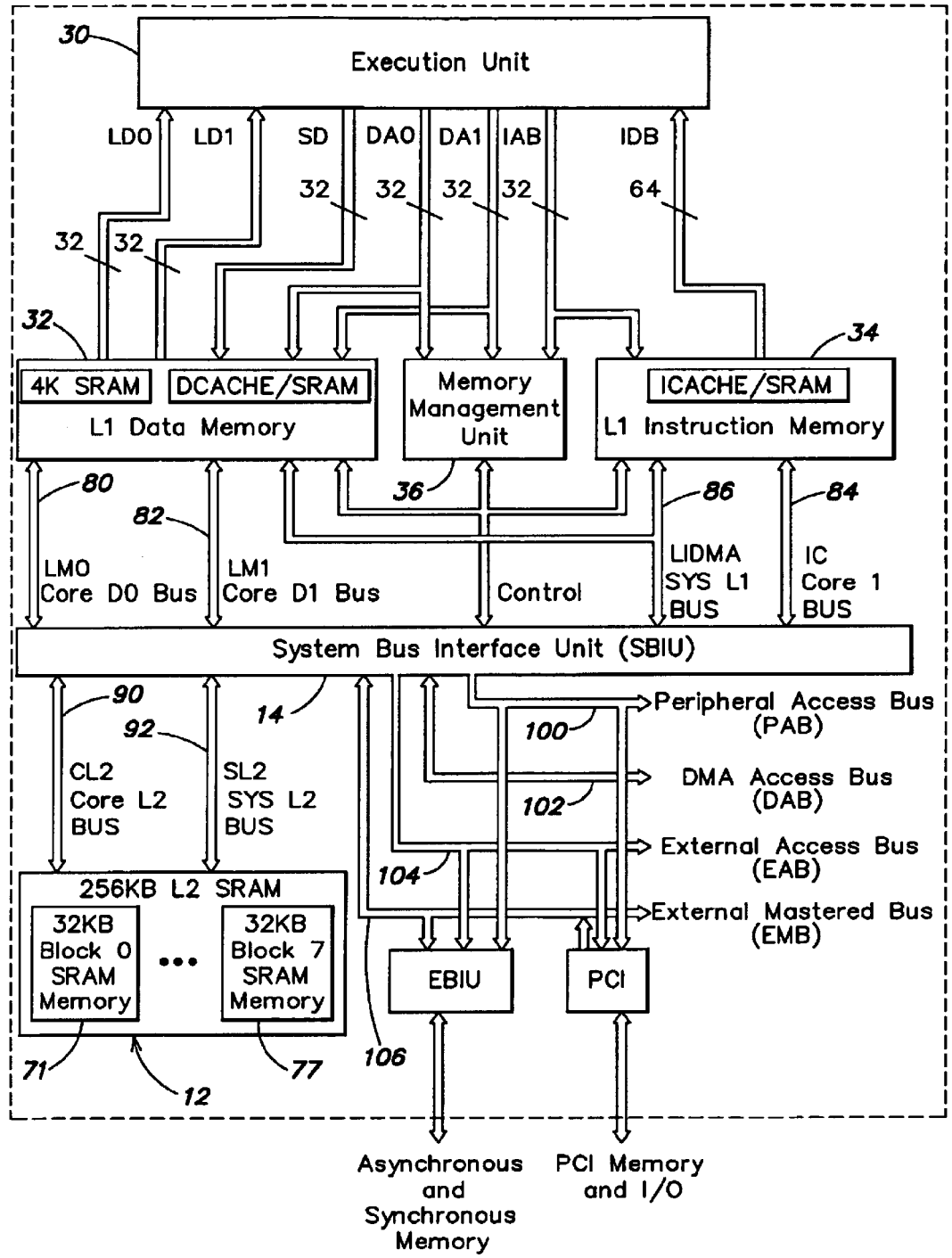
FIG. 2 is a block diagram of a memory architecture in the digital signal processor embodiment of FIG. 1.

System bus interface unit 14 is connected to core processor 10 by processor buses, which may include an LM0 bus 80, an LM1 bus 82 and an IC bus 84 (FIG. 2). LM0 bus 80 and LM1 bus 82 are connected to L1 data memory 32 and carry data between SBIU 14 and L1 data memory 32. IC bus 84 is connected to L1 instruction memory 34 and carries instructions between SBIU 14 and L1 instruction memory 34. System bus interface unit 14 is also connected to core processor 10 by an L1DMA bus 86. L1DMA bus 86 is connected to L1 data memory 32 and L1 instruction memory 34 and permits DMA transfers to and from L1 memories 32 and 34. System bus interface unit 14 is connected to L2 memory 12 by a first memory bus, CL2 bus 90, and a second memory bus, SL2 bus 92. As described below, CL2 bus 90 handles memory access requests from core processor 10, and SL2 bus 92 handles memory access requests from other components of the system. System buses, which may include a PAB bus 100, a DAB bus 102, an EAB bus 104 and an EMB bus 106, are connected between system bus interface unit 14 and other components of the digital signal processor.

The system bus interface unit 14 performs bus bridging functions in the digital signal processor. It functions as a crossbar switch, routing requests from the core processor 10, the PCI bus interface 56 and the DMA controller 16 to the appropriate destinations, such as L1 memories 32 and 34, L2 memory 12 and external memory via external bus interface unit 58. For example, the SBIU 14 provides parallel and concurrent data transfer capability between the core processor 10 and the system controllers where possible. To provide these functionalities, the SBIU 14 acts as a slave port to the requesting master, then arbitrates the master request for an appropriate bus and manages the bus transfer to complete the master request. In addition, the SBIU 14 performs clock domain conversion between the core processor 10 and the rest of the digital signal processor for various system clock to core clock ratios.

The SBIU 14 interfaces with the core processor 10 through four buses, LM0 bus 80, LM1 bus 82, IC bus 84 and L1DMA bus 86. Core processor 10 sends load/store requests to SBIU 14 through LM0 bus 80 and LM1 bus 82. The IC bus 84 is used by core processor 10 to fetch instructions. The L1DMA bus 86 is a slave port to core processor 10 and is used by the different DMA engines in the digital signal processor to move data directly into L1 data memory 32 or L1 instruction memory 34.

The SBIU 14 interfaces with the on-chip L2 memory 12 through CL2 bus 90 and SL2 bus 92. The SBIU 14 routes all transfer requests from core processor 10 on LM0 bus 80, LM1 bus 82 and IC bus 84 to the L2 memory 12. The CL2 bus 90 is dedicated to core processor 10 only and is designed to meet the high bandwidth requirements of the core processor 10. The CL2 bus 90 is fully pipelined and may include six pipeline stages for read transfers; it supports both single and burst transfers. The CL2 bus 90 has a 64-bit datapath and runs at the core processor frequency.

Components of the digital signal processor other than core processor 10 access L2 memory 12 through SL2 bus 92. The SBIU 14 identifies all transfer is requests from DAB bus 102 and EMB bus 106, arbitrates the requests and routes them to L2 memory 12 on SL2 bus 92. The SL2 bus 92 is designed to meet relatively lower bandwidth requirements from the system, since the system runs at slower clock frequency than core processor 10. The SBIU 14 converts the slower clock domain signals of the system buses to the core clock domain before sending them to L2 memory 12.

Figure 5:
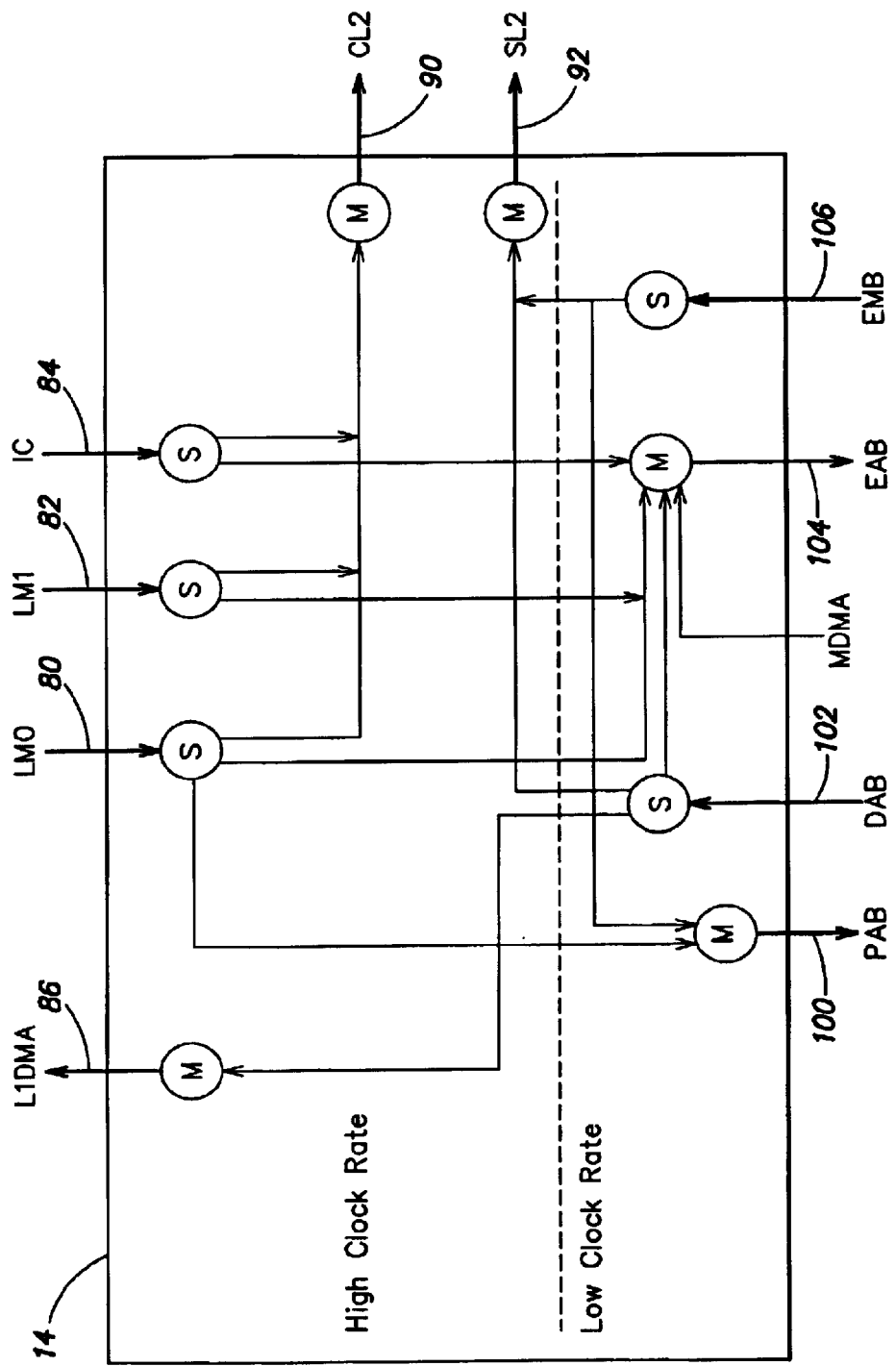
FIG. 5 is a schematic diagram that illustrates an example of bus routing in the system bus interface unit of FIG. 1.

FIG. 5 is a schematic diagram that shows how buses are routed to appropriate destinations by SBIU 14. In FIG. 5, each arrow represents a transfer request, "M" represents a bus for which SBIU 14 operates as a master, and "S" represents a bus for which SBIU 14 operates as a slave. Thus, for example, FIG. 5 indicates that transfer requests on LM0 bus 80, LM1 bus 82 and IC bus 84 are routed to L2 memory 12 via CL2 bus 90. Transfer requests on DAB bus 102 and EMB bus 106 are routed to L2 memory 12 via SL2 bus 92. FIG. 5 further indicates that LM0 bus 80, LM1 bus 82, IC bus 84, L1DMA bus 86, CL2 bus 90 and SL2 bus 92 operate at the relatively high frequency of the core clock, whereas PAB bus 100, DAB bus 102, EAB bus 104 and EMB bus 106 operate at the relatively low frequency of the system clock. The core clock domain and the system clock domain within SBIU 14 have a synchronous relationship. The system clock may operate at a selectable clock ratio of 2:1, 2.5:1, 3:1 or 4:1 with respect to the core clock, with the core clock having a higher frequency.

The SBIU 14 may include a power save function. When SBIU 14 determines that no transfer requests are being serviced, a power save signal is sent to L2 memory 12. When the power save signal is asserted, the clock to L2 memory 12 may be gated off, thereby reducing the power required by digital signal processor.

Figure 6:
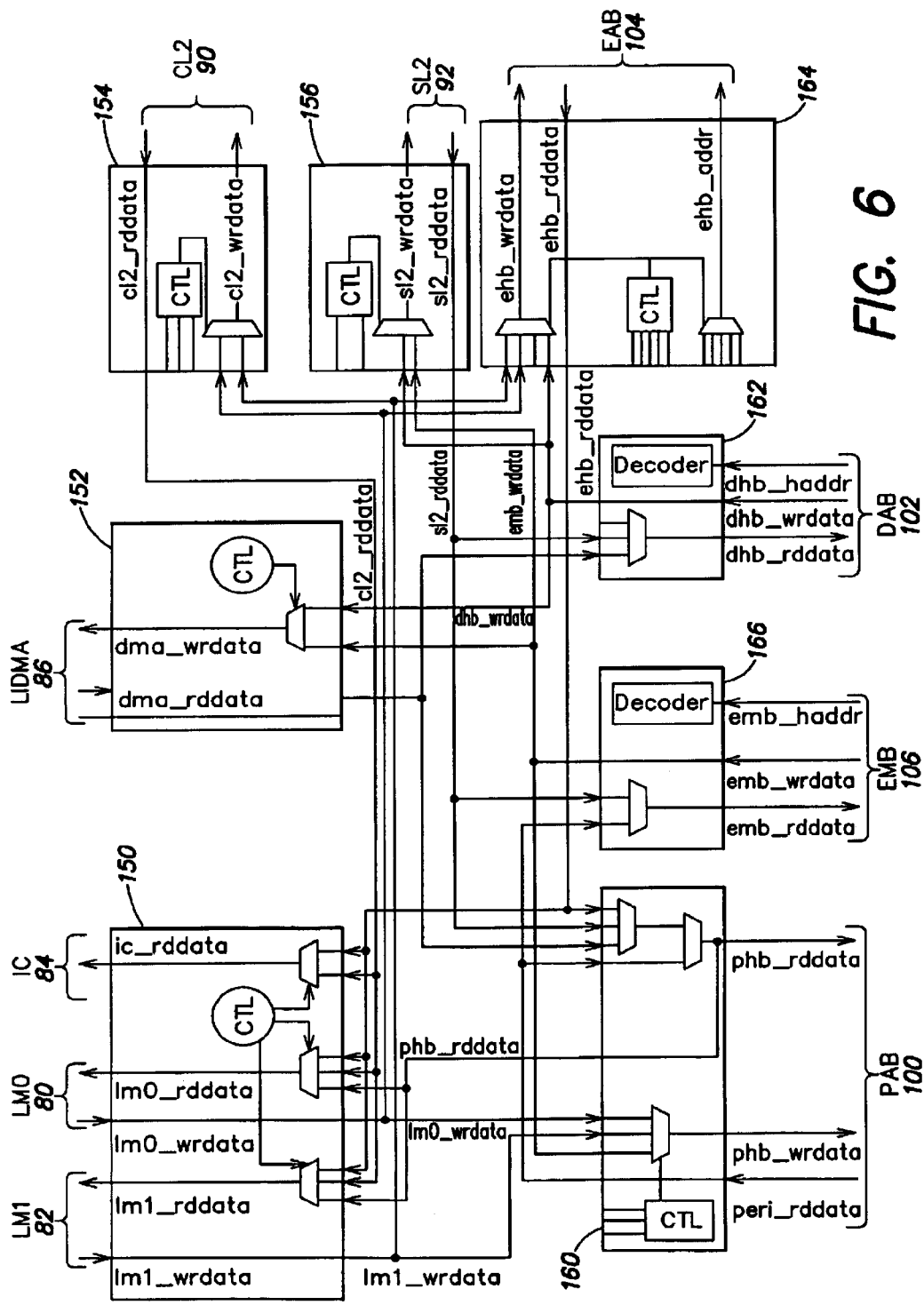
FIG. 6 is a block diagram of the system bus interface unit of FIG. 1.

A simplified block diagram of SBIU 14 is shown in FIG. 6. SBIU 14 includes a core bus controller 150 for controlling LM0 bus 80, LM1 bus 82 and IC bus 84, and an L1DMA bus controller 152 for controlling L1DMA bus 86. SBIU 14 further includes a first bus controller, CL2 bus controller 154, for controlling CL2 bus 90 and a second bus controller, SL2 bus controller 156, for controlling SL2 bus 92. Further, SBIU 14 includes a PAB bus controller 160 for controlling PAB bus 100, a DAB bus controller 162 for controlling DAB bus 102, an EAB bus controller 164 for controlling EAB bus 104 and an EMB bus controller 166 for controlling EMB bus 106. In general, each bus except IC bus 84 includes a read datapath and a write datapath. IC bus 84 does not include a write datapath because there is no requirement for core processor 10 to write instructions to any destination. In general, each bus controller includes control logic and a data selector for selecting a source of write data or a source of read data. For example, CL2 bus controller 154 may select write data from LM0 bus 80 or LM1 bus 82. SL2 bus controller 156 may select write data from DAB bus 102 or EMB bus 106. The CL2 bus controller 154 and the SL2 bus controller 156 are described in further detail below.

The CL2 bus controller 154 and the CL2 bus 90 may have a pipelined architecture to achieve high performance. The CL2 bus 90 is dedicated to transfer requests from core processor 10. The transfer requests are received on LM0 bus 80, LM1 bus 82 and IC bus 84. The CL2 bus controller 154 arbitrates core processor 10 requests and then initiates and controls bus cycles on CL2 bus 90. The CL2 bus 90 operates at the core clock frequency and supports single and burst mode transfers. The CL2 bus 90 may have a 64-bit wide datapath to support byte, half word, word and double word data transfers.

The pipeline operation for a memory read transfer is shown in FIG. 7A. The pipeline has a depth of six cycles, including five cycles for the CL2 bus and an additional cycle to send the read data from SBIU 14 to core processor 10. Thus, a read request has a latency of six cycles from the request to the first cycle of read data at the core processor interface. Referring to FIG. 7A, in cycle 1, core processor 10 requests a memory read transfer, and SBIU 14 performs arbitration of the request. In cycle 2, SBIU 14 issues a read request to L2 memory 12, and L2 memory 12 acknowledges the SBIU request. In cycle 3, L2 memory 12 performs address decoding, and SBIU 14 sends an address acknowledge to core processor 10. In cycle 4, L2 memory 12 accesses the memory array, and in cycle 5, L2 memory 12 drives the read data bus. In cycle 6, SBIU 14 drives the read data to core processor 10 and sends a data acknowledge to core processor 10.

Figure 7B:
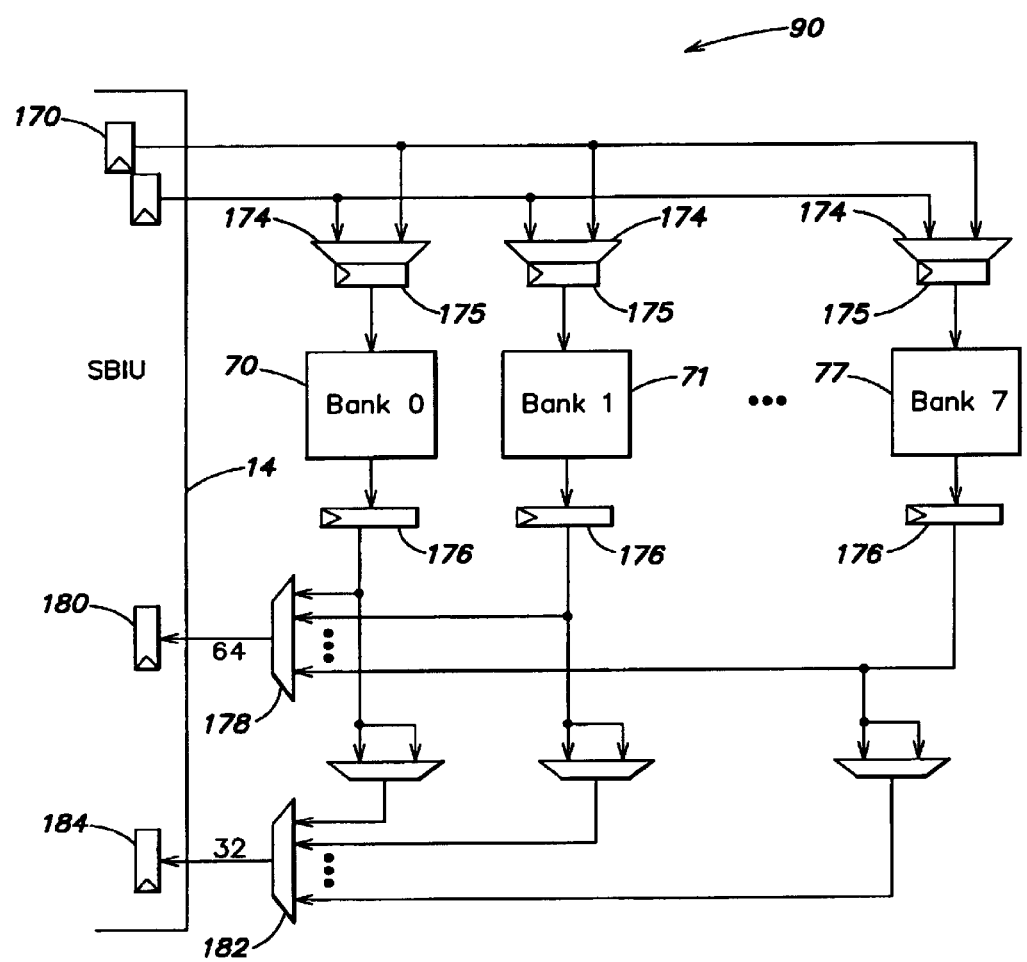
FIG. 7B is a schematic diagram of a part of the memory read pipeline shown in FIG. 7A.

A portion of the pipeline is shown schematically in FIG. 7B. One pipeline stage corresponds to each of the cycles shown in FIG. 7A. SBIU 14 includes a first pipeline stage (not shown) for receiving core processor transfer requests. A register 170 represents a second pipeline stage and corresponds to cycle 2 shown in FIG. 7A. Decoders 174 and registers 175 represent a third pipeline stage and correspond to cycle 3 shown in FIG. 7A. Memory banks 70, 71, ... 77 and registers 176 represent a fourth pipeline stage and correspond to cycle 4 shown in FIG. 7A. A 64-bit data selector 178, a register 180, a 32-bit data selector 182 and a register 184 represent a fifth pipeline stage and correspond to cycle 5 shown in FIG. 7A. SBIU 14 includes a sixth pipeline stage (not shown) for supplying read data to core processor 10.

The pipeline operation for a memory write transfer is illustrated in FIG. 8. In cycle 1, core processor 10 requests a memory write transfer, and SBIU 14 performs arbitration of the request. In cycle 2, SBIU 14 issues a write request to L2 memory 12, and L2 memory 12 acknowledges the SBIU request. In cycle 3, L2 memory 12 performs address decoding, and SBIU 14 sends an address acknowledge and a data acknowledge to core processor 10. In cycle 4, the L2 memory array is accessed and data is written in L2 memory 12.

The memory read transfer pipeline shown in FIGS. 7A and 7B and described above has a latency of six cycles and a throughput of one cycle. Thus, the first request in a series of consecutive read transfer requests has a latency of six cycles, and the following requests have a latency of one cycle. This operation may be represented as latencies of 6-1-1-1 clock cycles. The read transfer requests may originate on LM0 bus 80, LM1 bus 82 or IC bus 84. Each read transfer request may be a single read transfer request or a burst read transfer request. The read transfer request in the CL2 bus pipeline may originate from the same or different core processor buses, and the six cycle latency is incurred only with respect to the first memory read transfer request in a series of consecutive requests. Furthermore, a requester such as LM0 bus 80 can send a second request before receiving all data from a first request.

The depth of the pipeline affects the performance in servicing transfer requests. In particular, a pipeline having an insufficient number of stages results in stall cycles, also known as "bubbles", between data words in the case of back-to-back transfer requests. In order to avoid stall cycles, the pipeline depth in stages should be equal to or greater than the latency in servicing a single read transfer request. Using this approach, the first read transfer request has the specified latency, whereas read transfer requests following the first have a latency of one clock cycle.

Figure 9:
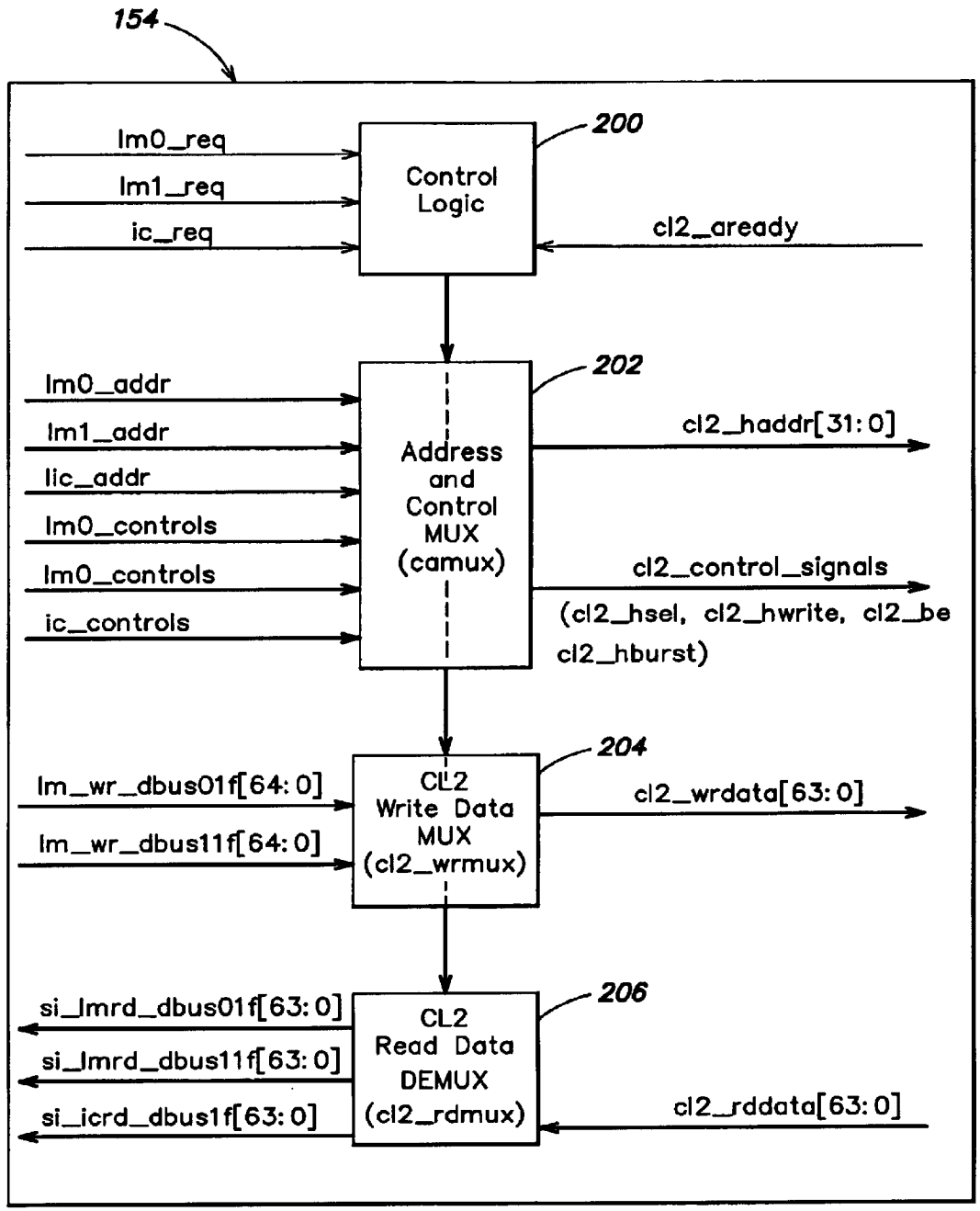
FIG. 9 is a block diagram of a first bus controller in the system bus interface unit of FIG. 6.

A block diagram of an embodiment of CL2 bus controller 154 is shown in FIG. 9. Control logic 200 includes an arbiter that arbitrates among transfer requests on LM0 bus 80, LM1 bus 82 and IC bus 84. In one embodiment, LM0 bus 80 has highest priority, LM1 bus 82 has second highest priority and IC bus 84 has lowest priority. It will be understood that different priorities may be utilized. An address and control multiplexer 202 selects the appropriate address and control signals according to the output of control logic 200. A write data multiplexer 204 selects the appropriate write data signals according to the output of control logic 200 in the case of a write data transfer. A read data demultiplexer 206 directs read data from L2 memory 12 to the appropriate destination in accordance with the output of control logic 200 in the case of a read data transfer.

As shown in FIG. 9, LM0 bus 80, LM1 bus 82 and CL2 bus 90 each have an address bus, a read data bus and a write data bus. IC bus 84 includes an address bus and a read data bus. This configuration allows overlapping of read transfers and write transfers, since the separate read and write data buses can be driven in the same clock cycle.

Figure 10:
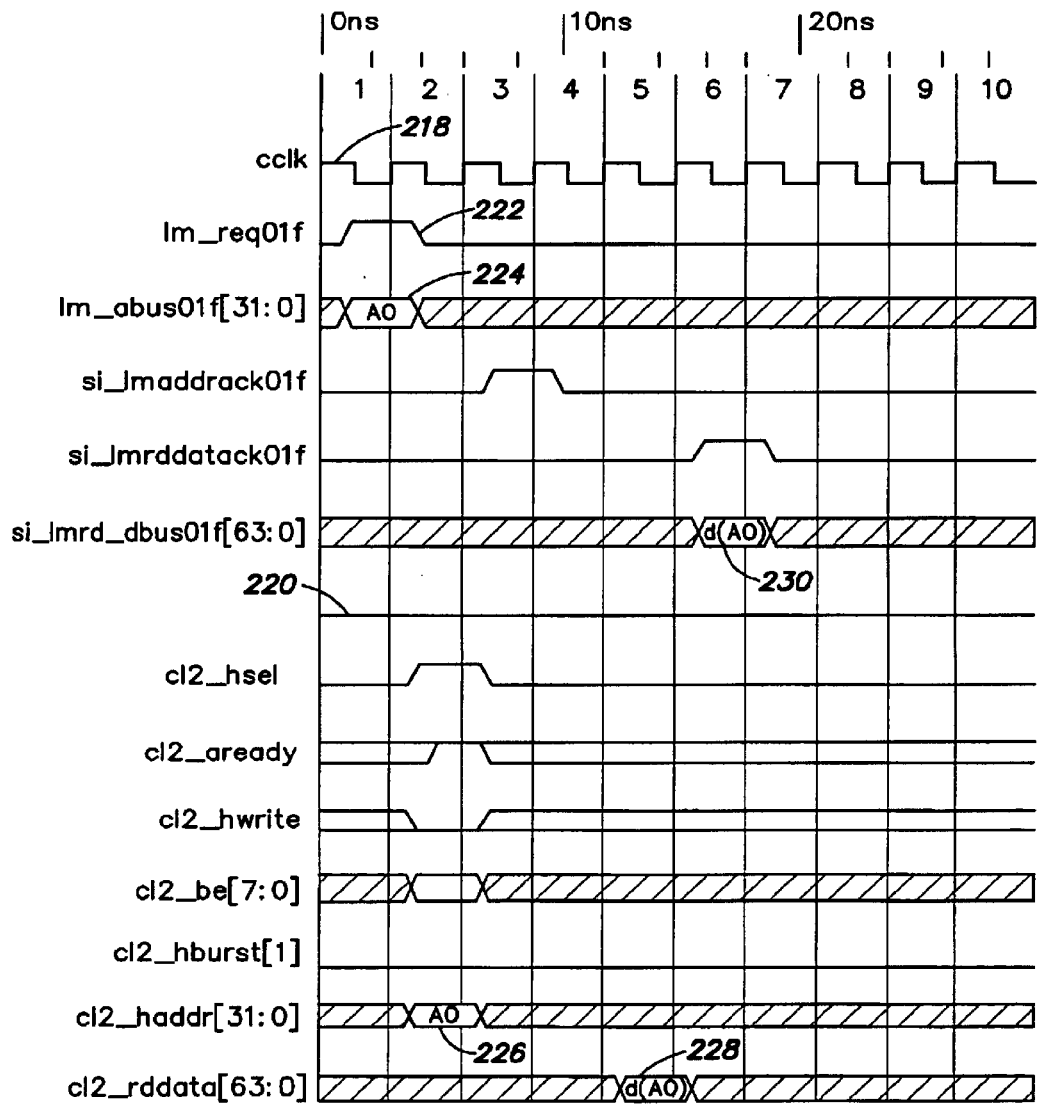
FIG. 10 shows examples of signal waveforms involved in a single read transfer on the first memory bus.

Signals associated with a single read transfer request by core processor 10 are shown in FIG. 10. Waveforms above line 220 in FIG. 10 represent signals on LM0 bus 80, and waveforms below line 220 represent signals on CL2 bus 90. A transfer request 222 and an address 224 are asserted by core processor 10 on LM0 bus 80 in clock cycle 1 of a core clock 218. The SBIU 14 issues an address 226 on CL2 bus 90 in clock cycle 2. The read data 228 is returned by L2 memory 12 on the read data lines of CL2 bus 90 in clock cycle 5, and the read data 230, which corresponds to read data 228, is supplied to core processor 10 on the read data lines of LM0 bus 80 in clock cycle 6.

Figure 11:
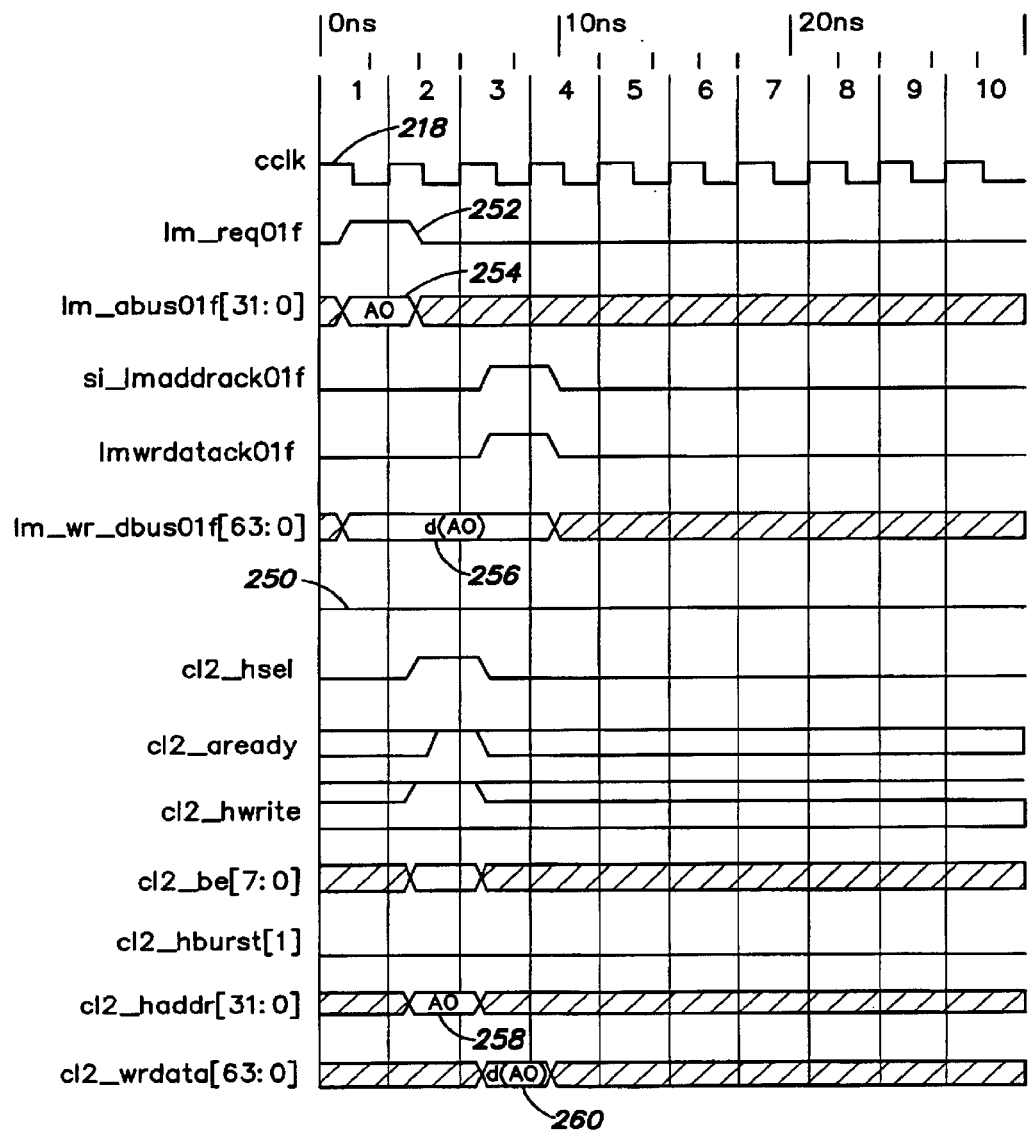
FIG. 11 shows examples of signal waveforms involved in a single write transfer on the first memory bus.

Signals associated with a single write transfer request by core processor 10 are shown in FIG. 11. Waveforms above line 250 in FIG. 11 represent signals on LM0 bus 80, and waveforms below line 250 represent signals on CL2 bus 90. A transfer request 252 and an address 254 are asserted by core processor 10 on LM0 bus 80 in clock cycle 1 of core clock 218. The write data 256 is present on LM0 bus 80 in clock cycles 1–3. The SBIU 14 issues an address 258 on CL2 bus 90 in clock cycle 2. The write data 260, which corresponds to write data 256, is supplied on the write data lines of CL2 bus 90 in clock cycle 3 and is written to the specified address in L2 memory 12.

Figure 12:
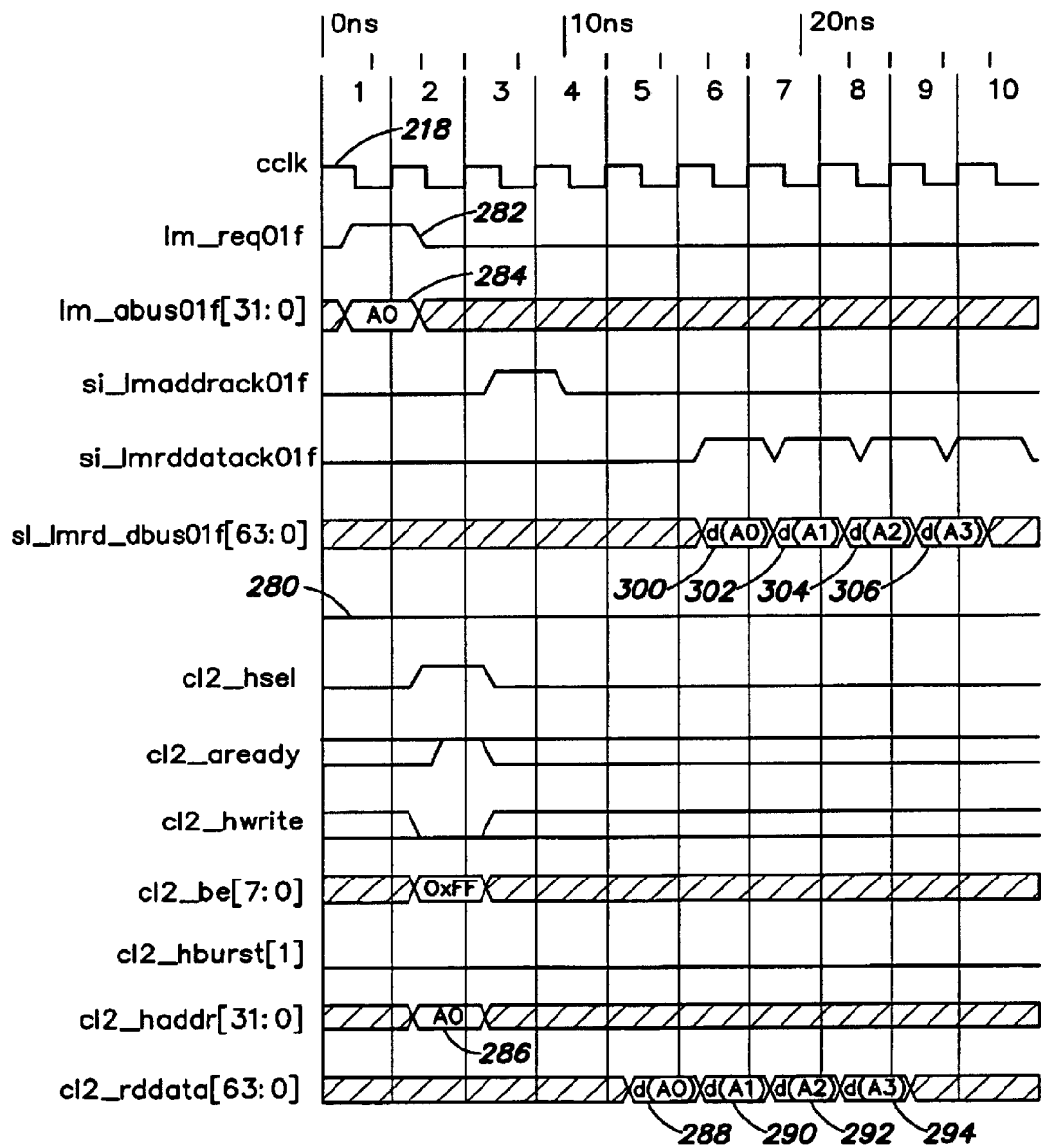
FIG. 12 shows examples of signal waveforms involved in a burst read transfer on the first memory bus.

Signals associated with a burst read transfer request by core processor 10 are shown in FIG. 12. Waveforms above line 280 in FIG. 12 represent signals on LM0 bus 80, and waveforms below line 280 represent signals on CL2 bus 90. A transfer request 282 and an address 284 are asserted by core processor 10 on LM0 bus 80 in clock cycle 1 of core clock 218. The SBIU 14 issues an address 286 on CL2 bus 90 in clock cycle 2. The first read data word 288 is returned by L2 memory 12 on the read data lines of CL2 bus 90 in clock cycle 5. Read data words 290, 292 and 294 are returned by L2 memory 12 on the read data lines of CL2 bus 90 in clock cycles 6, 7 and 8, respectively. Read data words 300, 302, 304 and 306, which correspond to read data words 288, 290, 292 and 294, respectively, are supplied to core processor 10 on LM0 bus 80 in clock cycles 6, 7, 8 and 9, respectively. Thus, the four data words of the burst have latencies of 6-1-1-1 clock cycles.

Read transfer requests on LM0 bus 80 are illustrated in FIGS. 10 and 12. In normal operation of the digital signal processor, core processor 10 may issue read transfer requests simultaneously on LM0 bus 80, LM1 bus 82 and IC bus 84. The read transfer requests on LM0 bus 80, LM1 bus 82 and IC bus 84 are combined on CL2 bus 90 in a interleaved manner. Because of the pipelined architecture of CL2 bus 90, a read transfer request may be started on each clock cycle, and a read transfer request may be completed on each clock cycle.

Figure 13:
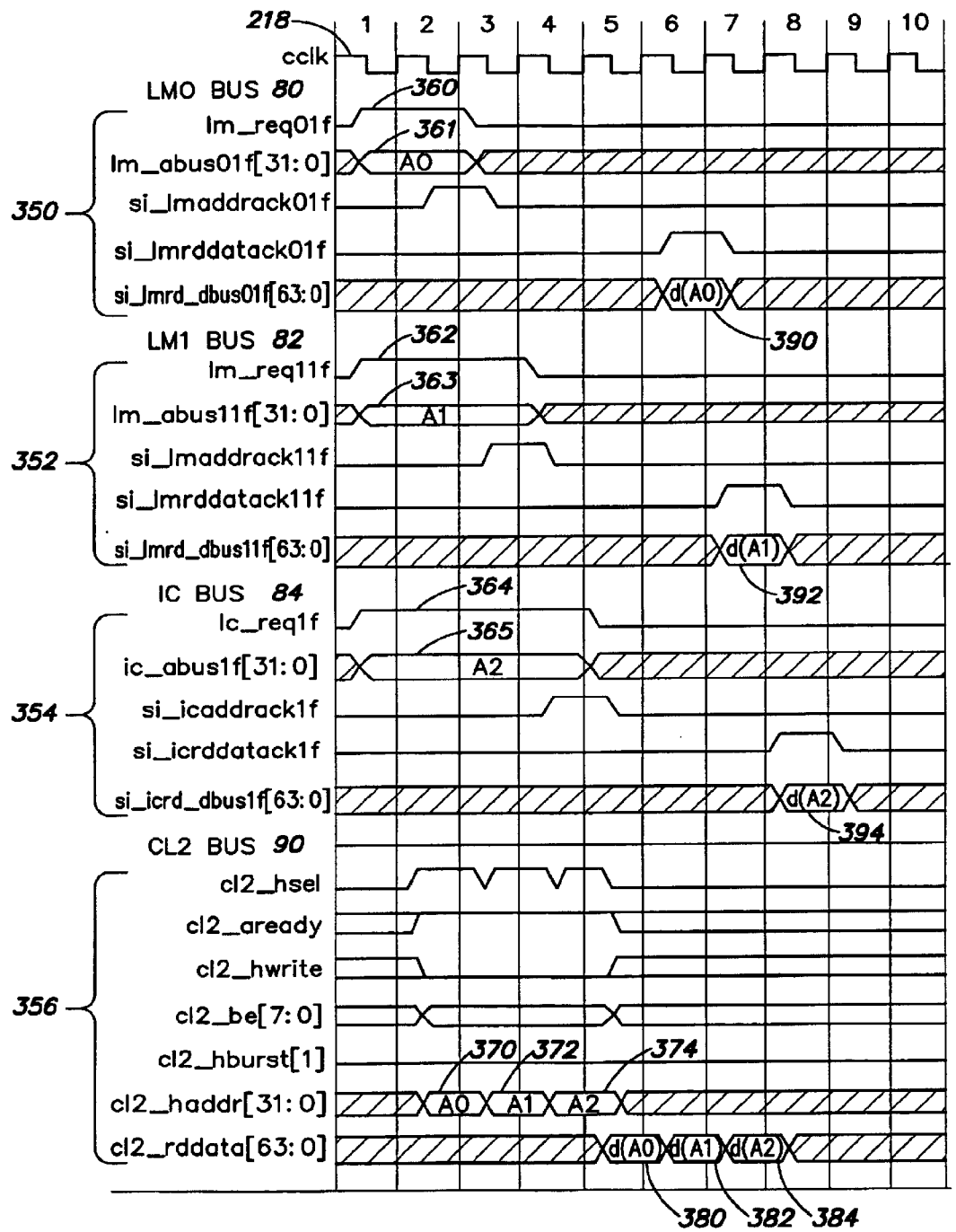
FIG. 13 shows examples of signal waveforms involved in back-to-back read transfers on the first memory bus.

Signals associated with back-to-back read transfer requests by core processor 10 are shown in FIG. 13. Waveforms 350 in FIG. 13 represent signals on LM0 bus 80, waveforms 352 represent signals on LM1 bus 82 and waveforms 354 represent signals on IC bus 84. Waveforms 356 in FIG. 13 represent signals on CL2 bus 90. A transfer request 360 and an address 361 are asserted by core processor 10 on LM0 bus 80 in clock cycle 1 of core clock 218. Similarly, a transfer request 362 and an address 363 are asserted by core processor 10 on LM1 bus 82 in clock cycle 1, and a transfer request 364 and an address 365 are asserted by core processor 10 on IC bus 84 in clock cycle 1. SBIU 14 issues an address 370 on CL2 bus 90 in clock cycle 2, an address 372 in clock cycle 3 and an address 374 in clock cycle 4. According to the priorities described above, addresses 370, 372 and 374 correspond to addresses 361, 363 and 365, respectively. Read data words 380, 382 and 384 are returned by L2 memory 12 on the read data lines of CL2 bus 90 in clock cycles 5, 6 and 7, respectively. Read data words 380, 382 and 384 correspond to addresses 370, 372 and 374, respectively. Read data word 390, which corresponds to read data word 380, is supplied to core processor 10 on LM0 bus 80 in clock cycle 6. Read data word 392, which corresponds to read data word 382, is supplied to core processor 10 on LM1 bus 82 in clock cycle 7. Read data word 394, which corresponds to read data word 384, is supplied to core processor 10 on IC bus 84 in clock cycle 8. Thus, the simultaneously requested data words are supplied to core processor 10 on successive clock cycles without stall cycles, also known as "bubbles", between data words. The latencies for the three data words are 6-1-1 clock cycles. If requested, additional data words may be supplied to core processor 10 on successive clock cycles.

Figure 14:
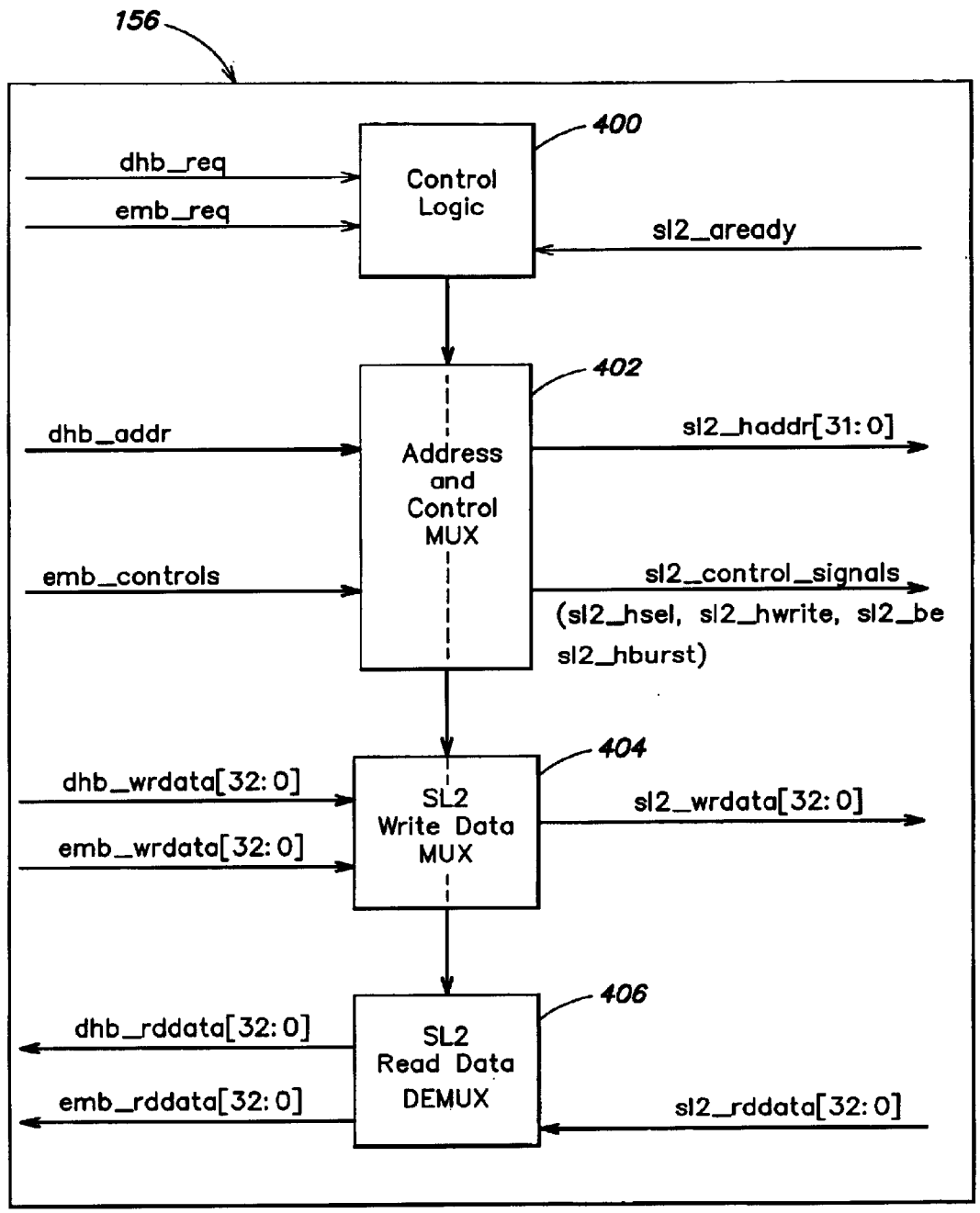
FIG. 14 is a block diagram of a second bus controller in the system bus interface unit of FIG. 6.

A block diagram of an embodiment of SL2 bus controller 156 is shown in FIG. 14. Control logic 400 includes an arbiter that arbitrates between transfer requests on EMB bus 106 and DAB bus 102. An address and control multiplexer 402 selects the appropriate address and control signals according to the output of control logic 400. A write data multiplexer 404 selects the appropriate write data signals according to the output of control logic 400 in the case of a write data transfer. A read data demultiplexer 406 directs read data from L2 memory 12 to the appropriate destination in accordance with the output of control logic 400 in the case of a read data transfer. The SL2 bus controller 156 has a pipelined architecture as described above in connection with CL2 bus controller 154. In addition, SL2 bus controller 156 performs clock domain conversion between the core clock domain and the system clock domain, as described below. EMB bus 106 and DAB bus 102 operate at the system clock frequency, whereas SL2 bus 92 operates at the core clock frequency.

Figure 15:
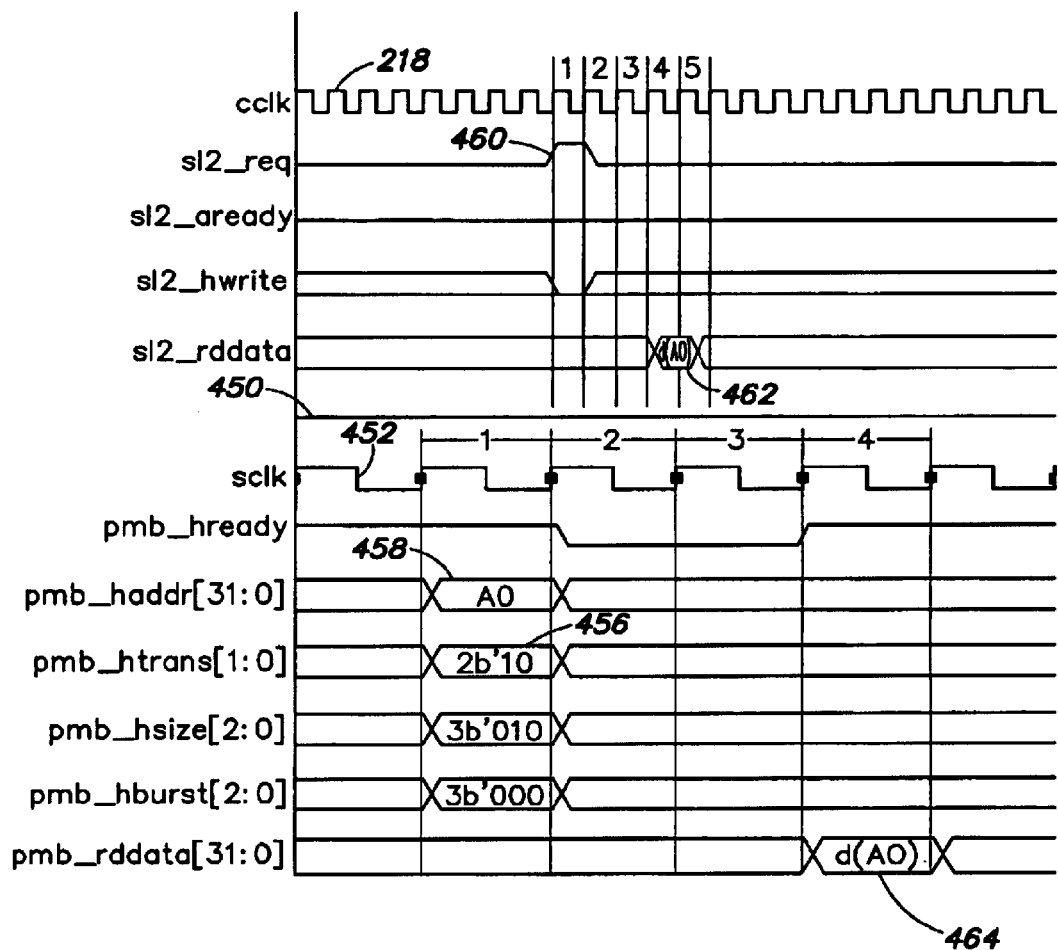
FIG. 15 shows examples of signal waveforms involved in a single read transfer on the second memory bus.

Signals associated with a single read transfer request on EMB bus 106 are shown in FIG. 15. Waveforms below line 450 in FIG. 15 represent signals on EMB bus 106, and waveforms above line 450 represent signals on SL2 bus 92. The EMB bus 106 uses a system clock 452, and the SL2 bus 92 uses the core clock 218. As shown, the system clock 452 has a lower frequency than the core clock 218. A transfer request 456 and an address 458 are asserted on EMB bus 106 in clock cycle 1 of system clock 452. The SBIU 14 issues a request 460 on SL2 bus 92 in clock cycle 1 of core clock 218 and receives the read data from L2 memory 12 on the read data lines of SL2 bus 92 in clock cycle 5 of core clock 218. The read data 464, which corresponds to read data 462, is supplied on the read data lines of EMB bus 106 in clock cycle 4 of system clock 452.

Figure 16:
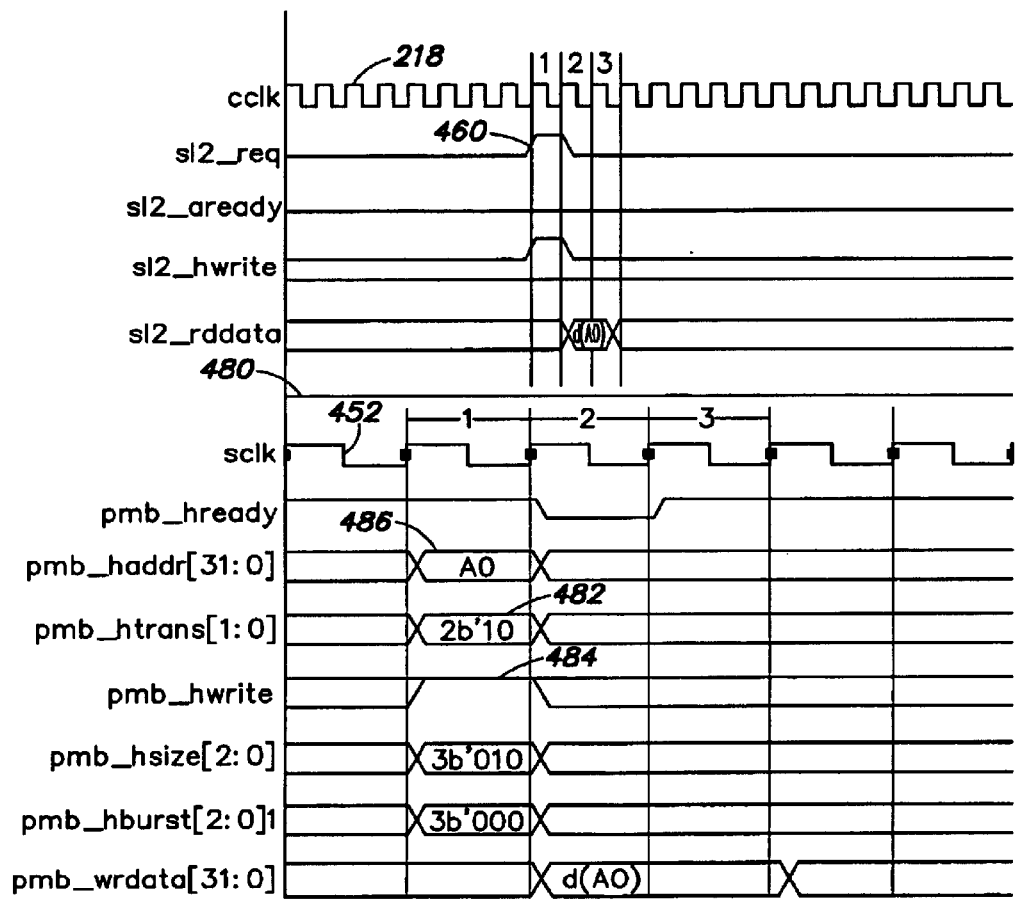
FIG. 16 shows examples of signal waveforms involved in a single write transfer on the second memory bus.

Signals associated with a single write transfer request on EMB bus 106 are shown in FIG. 16. Waveforms below line 480 in FIG. 16 represent signals on EMB bus 106, and waveforms above line 480 represent signals on SL2 bus 92. As described above, EMB bus 106 operates at the frequency of system clock 452, and SL2 bus 92 operates at the frequency of core clock 218. An EMB bus transfer request 482, a write signal 484 and a write address 486 are asserted on EMB bus 106 in clock cycle 1 of system clock 452. The SBIU 14 issues a request 490 on SL2 bus 92 in clock cycle 1 of core clock 218, which corresponds to clock cycle 2 of system clock 452. The write data is asserted on EMB bus 106 in clock cycle 2 of system clock 452, and the data is written to L2 memory 12 on the write data lines of SL2 bus 92 in clock cycle 3 of core clock 218. As shown, clock cycle 3 of core clock 218 occurs within clock cycle 2 of system clock 452. Thus, the write transfer is completed in two cycles of system clock 452.

As noted above, L2 memory 12 may be organized in blocks which are independently accessible. In the example of FIGS. 1–4, L2 memory 12 includes 8 blocks 70, 71 . . . 77. This memory architecture permits CL2 bus 90 and SL2 bus 92 to simultaneously access different blocks in CL2 memory 12. Thus, core processor 10 may be reading or writing data in one block of L2 memory 12 via CL2 bus 90 at the same time that a system component is reading or writing data in another block of L2 memory block via SL2 bus 92.

As noted above, SL2 bus controller 156 performs clock domain conversion between the core clock domain and the system clock domain. As shown in FIG. 5, core processor 10, L2 memory 12, LM0 bus 80, LM1 bus 82, IC bus 84, L1DMA bus 86, CL2 bus 90 and SL2 bus 92 operate at the higher core clock frequency. The remaining components of the digital signal processor, including PAB bus 100, DAB bus 102, EAB bus 104 and EMB bus 106, operate at the lower system clock frequency. Components that operate at the core clock frequency define a core clock domain, and components that operate at the system clock frequency define a system clock domain. The SBIU 14 is required to transfer signals between the core clock domain and the system clock domain, while avoiding latencies that can have an adverse effect on performance. The core clock domain and the system clock domain have a synchronous relationship. In one embodiment, a ratio between the core clock frequency and the system clock frequency is selectable. In one example, a clock ratio of 2:1, 2.5:1, 3:1 or 4:1 may be selected. In one specific example, the selected ratio is 3:1, the core clock frequency is 300 mHz and the system clock frequency is 100 mHz.

To minimize the latency of transfers between clock domains, some of the control functions are performed before the transfer between clock domains. This is achieved by using the core clock and a synchronization signal. An SCLK_SYNC synchronization signal is used for transfers from the core clock domain to the system clock domain. When asserted, the SCLK_SYNC synchronization signal indicates that the next rising edge of the core clock will line up with the next rising edge of the system clock. An ACK_EN synchronization signal is used for transfers from the system clock domain to the core clock domain. When asserted, the ACK_EN synchronization signal indicates that the next rising edge of the core clock is the first edge after the latest rising edge of the system clock.

Figure 17A:
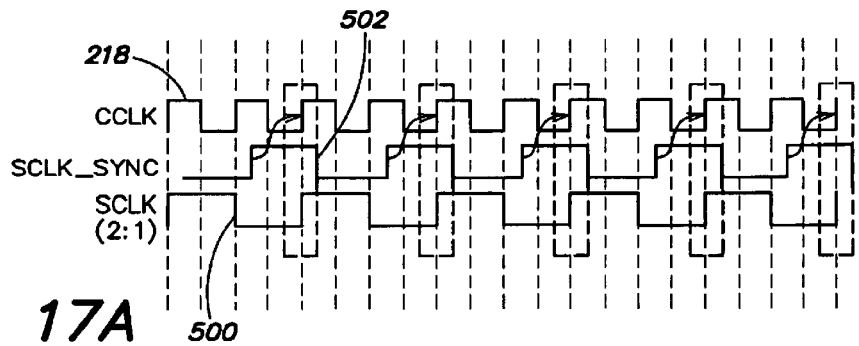
FIGS. 17A–17D are timing diagrams that illustrate core clock domain to system clock domain conversion waveforms for clock ratios of 2:1, 2.5:1, 3:1 and 4:1, respectively.
Figure 17B:
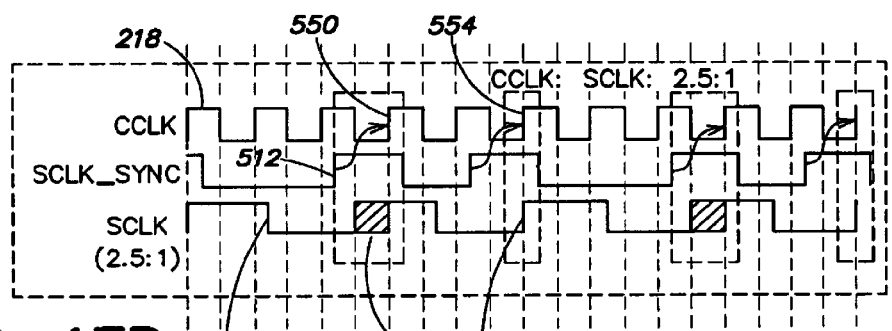
Figure 17C:
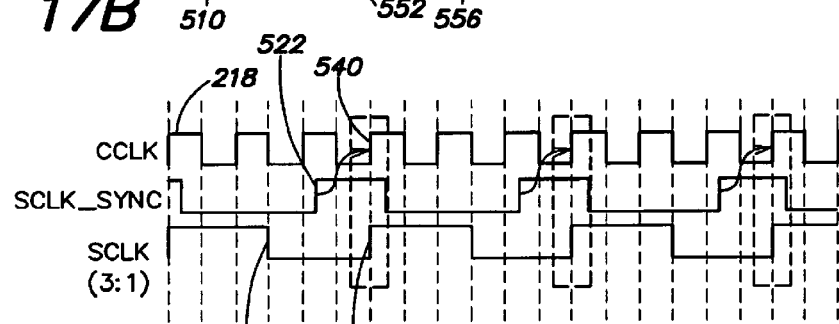
Figure 17D:
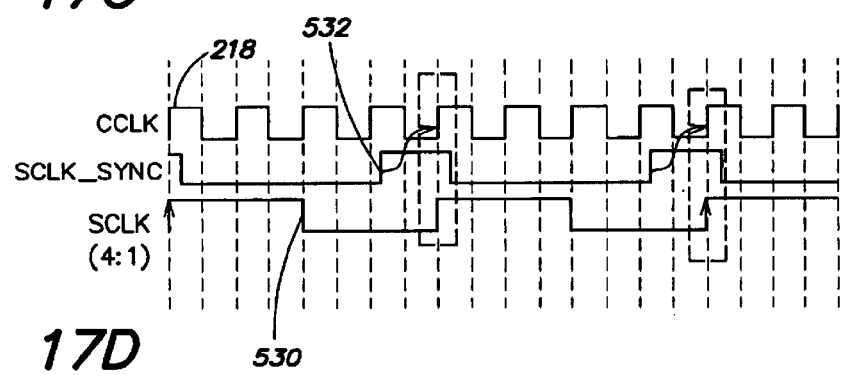

Signals associated with conversion from the core clock domain to the system clock domain for different clock ratios are shown in FIGS. 17A–17D. The system clock may be generated by dividing the frequency of the core clock. In another approach, the core clock and the system clock are generated by dividing a reference clock, using different divider ratios. In FIG. 17A, core clock 218 and a system clock 500 have a clock ratio of 2:1. In FIG. 17B, core clock 218 and a system clock 510 have a clock ratio of 2.5:1. In FIG. 17C, core clock 218 and a system clock 520 have a clock ratio of 3:1. In FIG. 17D, core clock 218 and a system clock 530 have a clock ratio of 4:1. Thus FIGS. 17A, 17C and 17D illustrate integer clock ratios. SCLK_SYNC synchronization signals 502, 512, 522 and 532 are utilized to synchronize clock domain conversion. Each SCLK_SYNC synchronization signal has the same frequency as the system clock and is phased so as to be asserted (logic high in this example), during a core clock cycle when the system clock has a rising edge. The SCLK_SYNC synchronization signal may be asserted for one core clock cycle per system clock cycle. The next core clock rising edge, which occurs during the period when the SCLK_SYNC synchronization signal is asserted, is aligned with a rising edge of the system clock (except in the case of a non-integer clock ratio, such as 2.5:1), and that core clock edge is used to transfer signals from the core clock domain to the system clock domain. Thus, for example, with reference to FIG. 17C, rising edge 540 of core clock 218 occurs when synchronization signal 522 is asserted and rising edge 540 is aligned with a rising edge 542 of system clock 520. Rising edge 540 of core clock 218 may be used to transfer signals from the core clock domain to the system clock domain as described below.

In the special case of a non-integer clock ratio, such as 2.5:1, the system clock edges do not all align with core clock edges. With reference to FIG. 17B, it may be observed that every other system clock rising edge aligns with a core clock rising edge. Using the synchronization technique described above, every other system clock cycle is effectively reduced by ½ core clock cycle. Referring again to FIG. 17B, core clock rising edge 550 is the first core clock rising edge after synchronization signal 512 is asserted. Rising edge 550 is not aligned with a rising edge of system clock 510, and a shaded portion 552 of system clock 510 is effectively lost. Rising edge 550 of core clock 218 may be used to transfer signals from the core clock domain to the system clock domain. Alternate system clock rising edges are aligned with core clock rising edges. Thus, for example, core clock rising edge 554 is aligned with system clock rising edge 556.

Signals associated with conversion from the system clock domain to the core clock domain are shown in FIGS. 18A–18D for different clock ratios. ACK_EN synchronization signals 560, 562, 564 and 566 are used to synchronize transfers from the system clock domain to the core clock domain for clock ratios of 2:1, 2.5:1, 3:1 and 4:1, respectively. Each ACK_EN synchronization signal has the same frequency as the system clock and is asserted (logic high in this example) for one core clock cycle per system clock cycle. The ACK_EN synchronization signal is phased such that a core clock rising edge that occurs when the ACK_EN synchronization signal is asserted is the first rising edge of the core clock following a rising edge of the system clock. Thus, for example, with reference to FIG. 18C, rising edge 570 of core clock 218 is the first rising edge that follows rising edge 572 of system clock 520. Signals are transferred from the system clock domain to the core clock domain on the rising edge 570 of core clock 218.

Figure 18A:
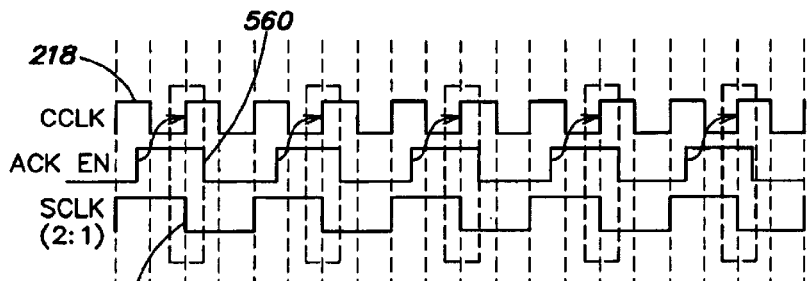
FIGS. 18A–18D are timing diagrams that illustrate system clock domain to core clock domain conversion waveforms for clock ratios of 2:1, 2.5:1, 3:1 and 4:1, respectively.
Figure 18B:
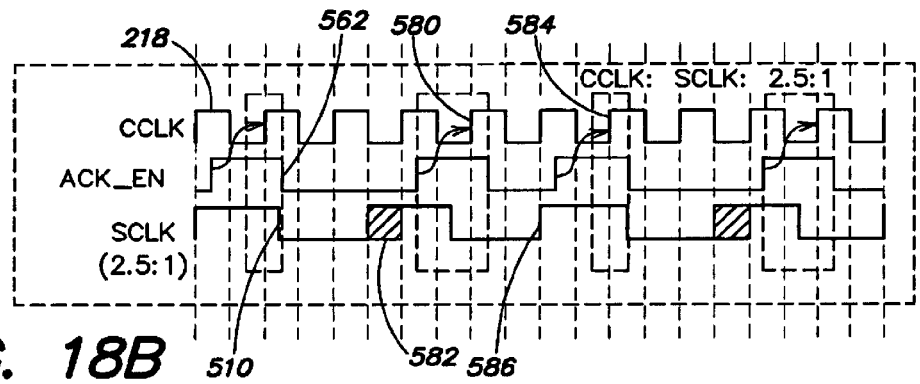
Figure 18C:
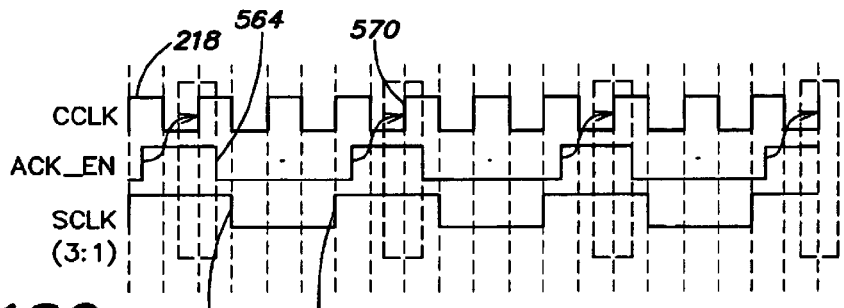
Figure 18D:
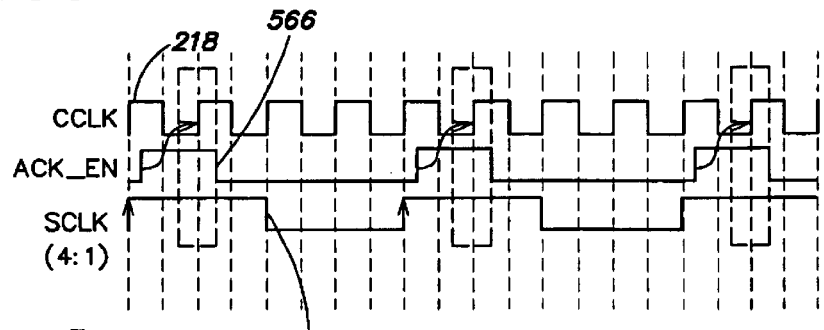

In the case of a non-integer clock ratio, as illustrated in FIG. 18B, every other system clock cycle is effectively reduced by ½ core clock cycle. Thus, rising edge 580 of core clock 218 is the first rising edge of core clock 218 that occurs when the ACK_EN synchronization signal is enabled. This effectively reduces the system clock 510 by ½ core clock cycle as indicated by shaded area 582. Alternate system clock cycles operate in the same manner as the integer clock ratio case. Thus, for example, rising edge 584 of core clock 218 is the first rising edge after rising edge 586 of system clock 510. Rising edge 584 occurs when the ACK_EN synchronization signal is asserted.

Figure 19:
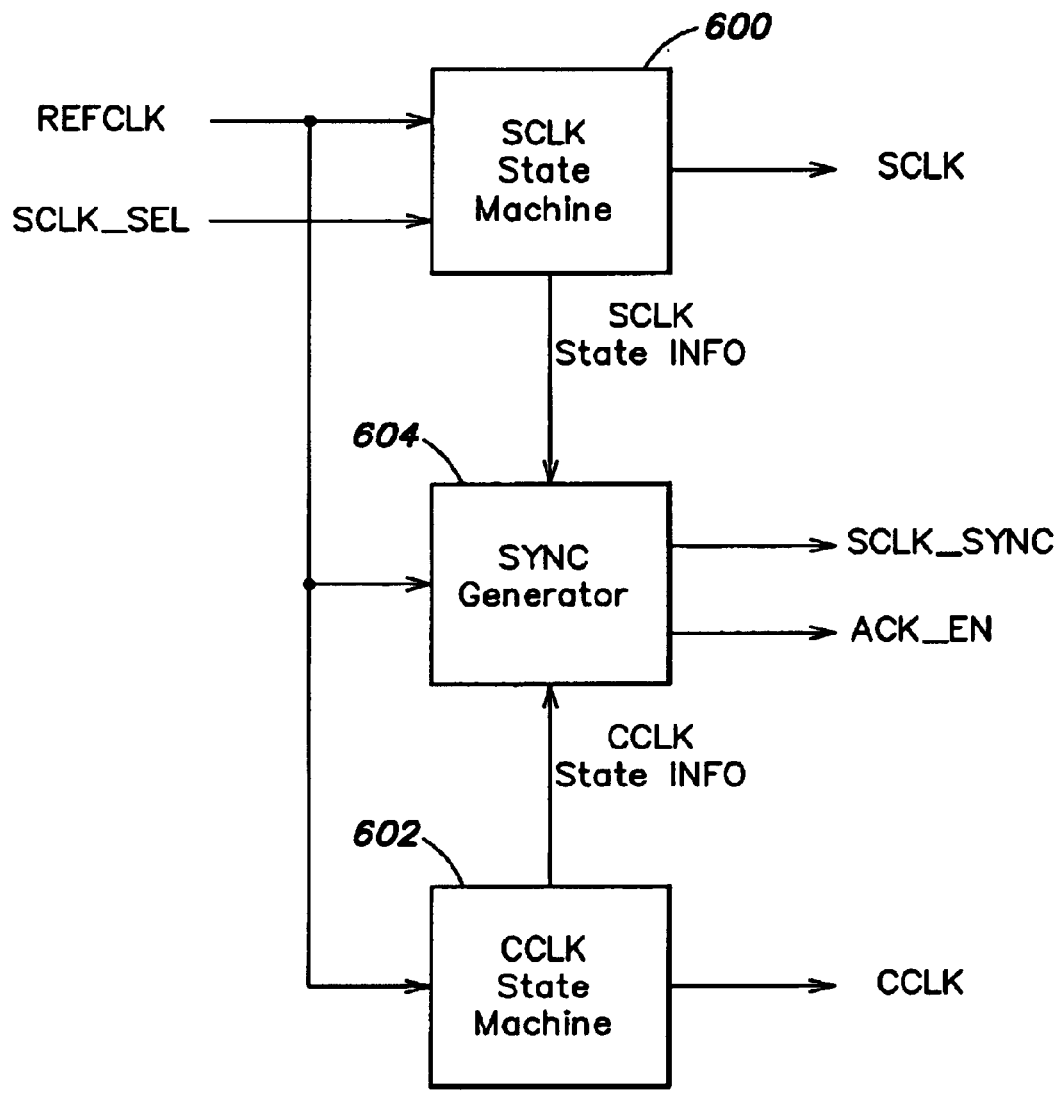
FIG. 19 is a block diagram of an embodiment of circuitry for generating core and system clocks and synchronization signals for clock domain conversion.

Circuitry for generating the core clock and the system clock with a selectable clock ratio and for generating the SCLK_SYNC and ACK_EN synchronization signals is shown in FIG. 19. A reference clock, REFCLK, is supplied to a system clock state machine 600, a core clock state machine 602 and a sync generator 604. The circuitry shown in FIG. 19 may be incorporated into the SL2 bus controller 156 shown in FIG. 14 and described above. The reference clock has a frequency of two times the desired core clock frequency in this example. A ratio select signal, SCLK_SEL, selects a desired clock ratio of the core clock frequency to the system clock frequency. As noted above, clock ratios of 2:1, 2.5:1, 3:1 and 4:1 may be selected in the present example. The system clock state machine 600 divides the reference clock frequency in accordance with the selected clock ratio to produce the system clock. The core clock state machine 602 divides the reference clock by 2 to produce the core clock. The sync generator 604 receives the reference clock and state information from the system clock state machine 600 and the core clock state machine 602 to produce the SCLK_SYNC synchronization signal as shown in FIGS. 17A–17D and to produce the ACK_EN synchronization signal as shown in FIGS. 18A–18D.

Figure 20:
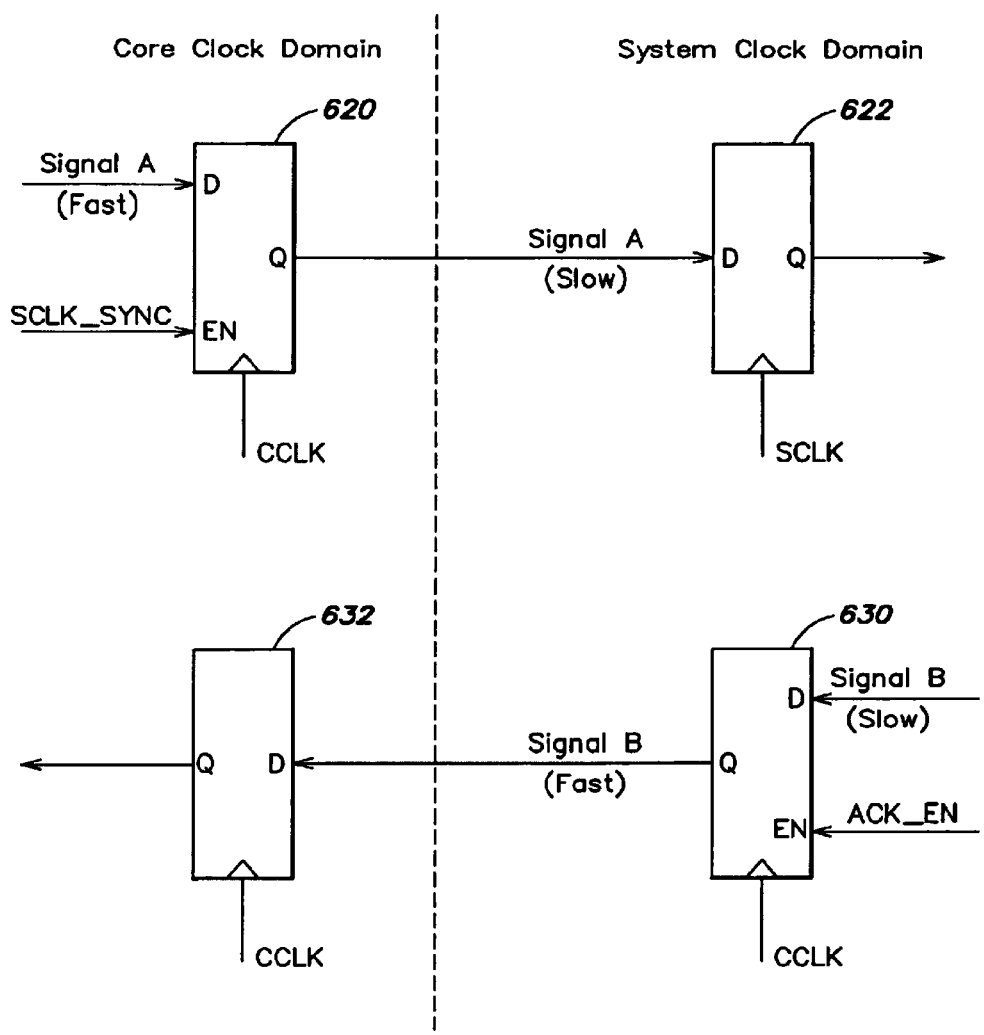
FIG. 20 is a schematic diagram of an embodiment of circuitry for clock domain conversion.

The transfer of signals between clock domains using the synchronization signals described above is illustrated in FIG. 20. A digital signal A is transferred from the core clock domain to the system clock domain by a flip-flop 620. Signal A is applied to the D input of flip-flop 620, the SCLK_SYNC synchronization signal is applied to the enable input of flip-flop 620 and the core clock is applied to the clock input of flip-flop 620. The output of flip-flop 620 is synchronous with the system clock domain. Using the example of FIG. 17C, the synchronization signal 522 enables flip-flop 620 and signal A is transferred to the output of flip-flop 620 on rising edge 540 of core clock 218. As illustrated in FIG. 17C, rising edge 540 of core clock 218 is synchronous with the rising edge 542 of system clock 520. Thus, the output of flip-flop 620 is synchronous with the system clock domain and may be applied to a flip-flop 622, for example, which is clocked by the system clock.

A digital signal B may be transferred from the system clock domain to the core clock domain using a flip-flop 630. Signal B is applied to the D input of flip-flop 630, the ACK_EN synchronization signal is applied to the enable input of flip-flop 630 and the core clock is applied to the clock input of flip-flop 630. The output of flip-flop 630 is synchronous with the core clock domain. Using the example of FIG. 18C, flip-flop 630 is enabled by synchronization signal 564 and signal B is transferred to the output of flip-flop 630 on the rising edge 570 of core clock 218. Rising edge 570 of core clock 218 is the first rising edge that occurs after rising edge 572 of system clock 520. Signal B is present at the input of flip-flop 630 following rising edge 572 of system clock 520. The output of flip-flop 630 is synchronous with the core clock domain and may, for example, be applied to the D input of a flip-flop 632, which is clocked by the core clock.

While there have been shown and described what are at present considered the preferred embodiments of the present invention, it will be obvious to those skilled in the art that various changes and modifications may be made therein without departing from the scope of the invention as defined by the appended claims.

What is claimed:

1. A method for clock domain conversion in a digital processing system, comprising:
   operating a first circuit in a fast clock domain with a fast clock and generating a fast signal in the fast clock domain;
   operating a second circuit in a slow clock domain with a slow clock;
   generating a first synchronization signal, based on the fast clock and the slow clock, that is asserted during each fast clock cycle in which a slow clock edge occurs; and
   transferring the fast signal from the fast clock domain to the slow clock domain on a fast clock edge when the first synchronization signal is asserted.

2. A method as defined in claim 1, wherein the fast clock and the slow clock have a predetermined clock frequency ratio.

3. A method as defined in claim 1, wherein the fast clock and the slow clock have in a selectable clock frequency ratio.

4. A method as defined in claim 3, wherein the selectable clock frequency ratio is an integer.

5. A method as defined in claim 3, wherein the selectable clock frequency ratio is an integer or a non-integer.

6. A method as defined in claim 1, wherein the step of transferring the fast signal from the fast clock domain to the slow clock domain comprises applying the fast signal to a data input of a flip-flop, applying the first synchronization signal to an enable input of the flip-flop and applying the fast clock to a clock input of the flip-flop, wherein an output of the flip-flop is in the slow clock domain.

7. A method for clock domain conversion in a digital processing system, comprising:
   operating a first circuit in a fast clock domain with a fast clock;
   operating a second circuit in a slow clock domain with a slow clock and generating a slow signal in the slow clock domain;
   generating a second synchronization signal, based on the fast clock and the slow clock, that is asserted during each fast clock cycle that immediately follows a slow clock edge; and
   transferring the slow signal from the slow clock domain to the fast clock domain on a fast clock edge when the second synchronization signal is asserted.

8. A method as defined in claim 7, wherein the fast clock and the slow clock have a predetermined clock frequency ratio.

9. A method as defined in claim 7, wherein the fast clock and the slow clock have a selectable clock frequency ratio.

10. A method as defined in claim 9, wherein the selectable clock frequency ratio is an integer.

11. A method as defined in claim 9, wherein the selectable clock frequency ratio is an integer or a non-integer.

12. A method as defined in claim 7, wherein the step of transferring the slow signal from the slow clock domain to the fast clock domain comprises applying the slow signal to a data input of a flip-flop, applying the second synchronization signal to an enable input of the flip-flop and applying the fast clock to a clock input of the flip-flop, wherein an output of the flip-flop is in the fast clock domain.

13. Apparatus for clock domain conversion in a digital processing system comprising:

a first clock for generating a fast clock;

a second clock for generating a slow clock;

a synchronization circuit for generating a first synchronization signal, based on the fast clock and the slow clock, that is asserted during each fast clock cycle in which a slow clock edge occurs; and a transfer circuit for transferring a fast signal from the fast clock domain to the slow clock domain on a fast clock edge when the first synchronization signal is asserted.

14. Apparatus for clock domain conversion in a digital processing system, comprising:

a first clock for generating a fast clock;

a second clock for generating a slow clock;

a synchronization circuit for generating a second synchronization signal, based on the fast clock and the slow clock, that is asserted during each fast clock cycle that immediately follows a slow clock edge; and a transfer circuit for transferring a slow signal from the slow clock domain to the fast clock domain on a fast clock edge when the second synchronization signal is asserted.

* * * * *